US011239897B2

(12) United States Patent
Tsai et al.

(10) Patent No.: US 11,239,897 B2
(45) Date of Patent: Feb. 1, 2022

(54) METHODS AND APPARATUSES FOR BEAM FAILURE RECOVERY (BFR)

(71) Applicant: FG Innovation Company Limited, Tuen Mun (HK)

(72) Inventors: Hsin-Hsi Tsai, Taipei (TW); Heng-Li Chin, Taipei (TW); Hung-Chen Chen, Taipei (TW); Chia-Hao Yu, Taipei (TW); Chia-Hung Wei, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/935,105

(22) Filed: Jul. 21, 2020

(65) Prior Publication Data

US 2021/0028848 A1    Jan. 28, 2021

Related U.S. Application Data

(60) Provisional application No. 62/877,257, filed on Jul. 22, 2019.

(51) Int. Cl.
*H04W 76/19* (2018.01)
*H04B 7/06* (2006.01)
(Continued)

(52) U.S. Cl.
CPC .......... *H04B 7/0695* (2013.01); *H04W 16/28* (2013.01); *H04W 72/046* (2013.01);
(Continued)

(58) Field of Classification Search
CPC ........ H04B 7/0695; H04B 7/088; H04B 7/08; H04W 76/19; H04W 72/046;
(Continued)

(56) References Cited

U.S. PATENT DOCUMENTS

2018/0279229 A1    9/2018 Dinan et al.
2018/0368142 A1*  12/2018 Liou ................. H04W 16/14
(Continued)

FOREIGN PATENT DOCUMENTS

CN    109982431 A    7/2019
WO    2019032882 A1   2/2019

OTHER PUBLICATIONS

Nokia Offline 104: Timer based BFR MAC CE Transmission 3GPP RAN WG2 Meeting #109bis-e, R2-2003903 Apr. 30, 2020(Apr. 30, 2020) section 2.
(Continued)

*Primary Examiner* — Thai Nguyen
(74) *Attorney, Agent, or Firm* — ScienBiziP, P.C.

(57) ABSTRACT

A method for Beam Failure Recovery (BFR) performed by a User Equipment (UE) includes the UE receiving, from a Base Station (BS), a first configuration indicating a first Reference Signal (RS) associated with a first cell of the BS, determining whether a first beam failure event is detected on the first cell by assessing a first radio link quality based on the first RS, triggering a first BFR procedure for the first cell when the first beam failure event is detected on the first cell, and when the first BFR procedure is triggered and not cancelled, performing operations including: determining whether the UE is allocated with an Uplink (UL) resource that is available for transmitting a BFR report, where the UL resource is a Physical Uplink Shared Channel (PUSCH) resource, when the UE is allocated with the UL resource, generating, in response to the first BFR procedure, the BFR report, and transmitting, on the UL resource, the BFR report to the BS, and when the UE is not allocated with the UL resource, triggering, in response to the first BFR procedure, a Scheduling Request (SR) procedure for BFR.

18 Claims, 6 Drawing Sheets

(51) Int. Cl.
*H04W 72/04* (2009.01)
*H04W 74/08* (2009.01)
*H04W 72/14* (2009.01)
*H04W 16/28* (2009.01)

(52) U.S. Cl.
CPC ....... *H04W 72/14* (2013.01); *H04W 74/0833* (2013.01); *H04W 76/19* (2018.02)

(58) Field of Classification Search
CPC . H04W 74/0833; H04W 72/14; H04W 16/28; H04W 72/1289
See application file for complete search history.

(56) References Cited

U.S. PATENT DOCUMENTS

2019/0166539 A1\* 5/2019 Chen ..................... H04W 36/36
2020/0314722 A1\* 10/2020 Kyung ................. H04B 7/0695

OTHER PUBLICATIONS

Intel Corporation On Beam Management Enhancement 3GPP TSG RAN WG1 Meeting #97, R1-1906816 May 17, 2019(May 17, 2019) the whole document.

Austek 3GPP TSG-RAN WG2 Meeting #102, R2-1806916 Discussion on PUCCH beam failure recovery request in NR May 25, 2018(May 25, 2018) section 2.

\* cited by examiner

DESCRIPTION
METHODS AND APPARATUSES FOR BEAM FAILURE RECOVERY (BFR)

CROSS-REFERENCE TO RELATED APPLICATION(S)

The present disclosure claims the benefit of and priority to provisional U.S. Patent Application Ser. No. 62/877,257 ("the '257 provisional"), filed on Jul. 22, 2019, entitled "Method and Apparatus for Initialization of Beam Failure Recovery". The contents of the '257 provisional are fully incorporated herein by reference for all purposes.

FIELD

The present disclosure generally relates to wireless communications, and more particularly, to methods and apparatuses for Beam Failure Recovery (BFR).

BACKGROUND

With the tremendous growth in the number of connected devices and the rapid increase in user/network traffic volume, various efforts have been made to improve different aspects of wireless communication for the next generation wireless communication system, such as the fifth generation (5G) New Radio (NR), by improving data rate, latency, reliability and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in the art.

SUMMARY

The present disclosure is directed to methods and apparatuses for BFR.

According to an aspect of the present disclosure, a method for BFR performed by a User Equipment (UE) is provided. The method includes the UE receiving, from a Base Station (BS), a first configuration indicating a first Reference Signal (RS) associated with a first cell of the BS, determining whether a first beam failure event is detected on the first cell by assessing a first radio link quality based on the first RS, triggering a first BFR procedure for the first cell when the first beam failure event is detected on the first cell, and when the first BFR procedure is triggered and not cancelled, performing operations including: determining whether the UE is allocated with an Uplink (UL) resource that is available for transmitting a BFR report, where the UL resource is a Physical Uplink Shared Channel (PUSCH) resource, when the UE is allocated with the UL resource, generating, in response to the first BFR procedure, the BFR report, and transmitting, on the UL resource, the BFR report to the BS, and when the UE is not allocated with the UL resource, triggering, in response to the first BFR procedure, a Scheduling Request (SR) procedure for BFR.

According to another aspect of the present disclosure, a UE is provided. The UE includes a memory and at least one processor coupled to the memory The at least one processor may be configured to receive, from a BS, a first configuration indicating a first RS associated with a first cell of the BS, determine whether a first beam failure event is detected on the first cell by assessing a first radio link quality based on the first RS, trigger a first BFR procedure for the first cell when the first beam failure event is detected on the first cell, and when the first BFR procedure is triggered and not cancelled, perform operations including: determine whether the UE is allocated with an UL resource that is available for transmitting a BFR report, where the UL resource is a PUSCH resource, when the UE is allocated with the UL resource, generate, in response to the first BFR procedure, the BFR report, and transmit, on the UL resource, the BFR report to the BS, and when the UE is not allocated with the UL resource, trigger, in response to the first BFR procedure, an SR procedure for BFR.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
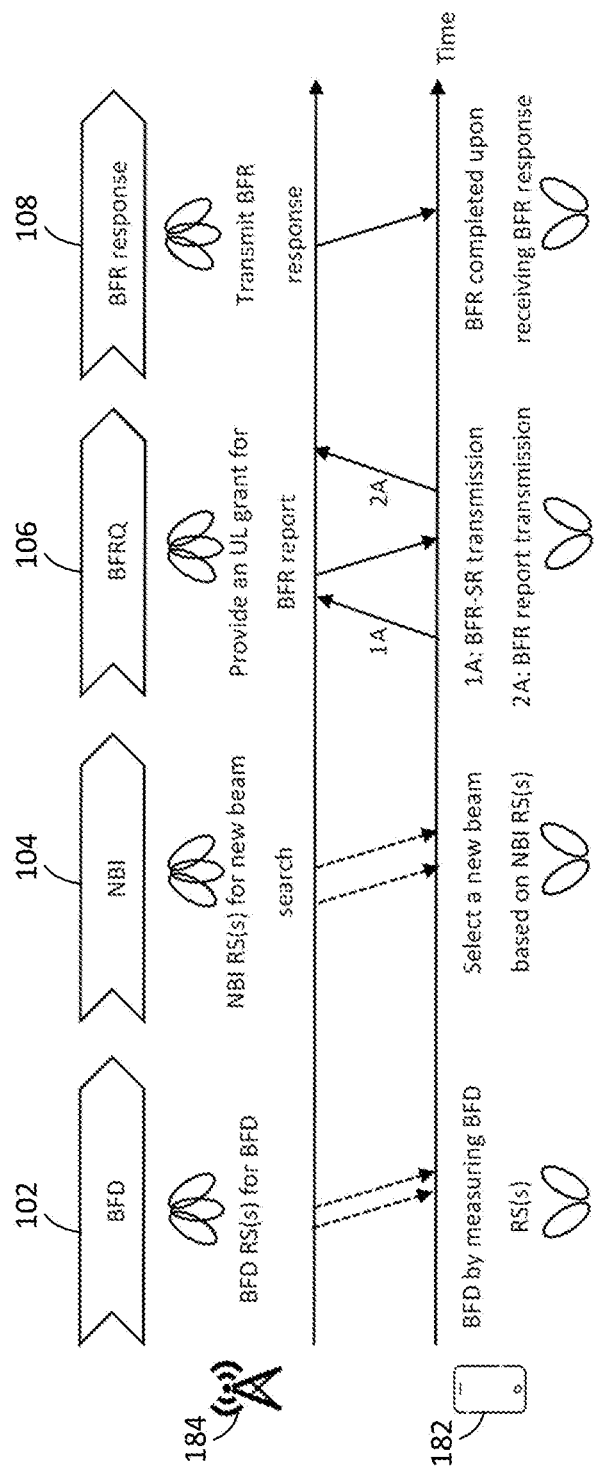
FIG. 1 illustrates a BFR procedure triggered for a Secondary Cell (SCell) according to an implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may differ in other respects, and thus shall not be narrowly confined to what is shown in the figures.

References to "one implementation," "an implementation," "example implementation," "various implementations," "some implementations," "implementations of the present disclosure," etc., may indicate that the implementation(s) of the present disclosure so described may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

The term "and/or" herein is only an association relationship for describing associated objects, and represents that three relationships may exist, for example, A and/or B may represent that: A exists alone, A and B exist at the same time, and B exists alone. "A and/or B and/or C" may represent that at least one of A, B and C exists. In addition, the character "/" used herein generally represents that the former and latter associated objects are in an "or" relationship.

Additionally, for the purpose of non-limiting explanation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Any two or more than two of the following paragraphs, (sub)-bullets, points, actions, behaviors, terms, or claims described in the present disclosure may be combined logically, reasonably, and properly to form a specific method. In addition, any sentence, paragraph, (sub)-bullet, point, action, behaviors, terms, or claims described in the present disclosure may be implemented independently and separately to form a specific method.

Dependency, e.g. "based on", "more specifically", "preferably", "In one embodiment", or etc., in the following invention(s) is just one possible example which may not restrict the specific method.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, a LTE-Advanced (LTE-A) system, or a LTE-Advanced Pro system) typically includes at least one Base Station (BS), at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a Next-Generation Core (NGC), or an Internet), through a Radio Access Network (RAN) established by the BS.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM EDGE Radio Access Network (GERAN), an ng-eNB as in an E-UTRA BS in connection with the 5GC, a next generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, eLTE, NR (often referred to as 5G), and LTE-A Pro. However, the scope of the present disclosure should not be limited to the above mentioned protocols.

The BS may be operable to provide radio coverage to a specific geographical area using a plurality of cells being included the RAN. The BS may support the operations of the cells. Each cell is operable to provide services to at least one UE within its radio coverage. In some implementations, each cell (often referred to as a serving cell) may provide services to serve one or more UEs within its radio coverage, (e.g., each cell schedules the Downlink (DL) and optionally UL resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe). Each cell may have overlapped coverage areas with other cells. In MR-DC cases, the primary cell of a Master Cell Group (MCG) or a Secondary Cell Group (SCG) may be called as a Special Cell (SpCell). A Primary Cell (PCell) may refer to the SpCell of an MCG. A Primary Secondary Cell (PSCell) may refer to the SpCell of an SCG. MCG means a group of serving cells associated with the Master Node (MN), comprising of the SpCell and optionally one or more secondary cells (SCells). SCG means a group of serving cells associated with the Secondary Node (SN), comprising of the SpCell and optionally one or more SCells.

As discussed above, the frame structure for NR is to support flexible configurations for accommodating various next generation (e.g., 5G) communication requirements, such as eMBB, mMTC and URLLC, while fulfilling high reliability, high data rate and low latency requirements. The orthogonal frequency-division multiplexing (OFDM) technology as agreed in 3rd Generation Partnership Project (3GPP) may serve as a baseline for an NR waveform. The scalable OFDM numerology, such as the adaptive subcarrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, a DL transmission data, a guard period, and a UL transmission data should at least be included, where the respective portions of the DL transmission data, the guard period, the UL transmission data should also be configurable, for example, based on the network dynamics of NR. In addition, sidelink resource may also be provided in an NR frame to support ProSe services.

An objective of the 5G on new RAT is to identify and develop technology components needed for NR systems which is able to use any spectrum band ranging at least up to 100 GHz. Supporting carrier frequencies up to 100 GHz brings a number of challenges in the area of radio propagation. As the carrier frequency increases, the path loss also increases.

In lower frequency bands (e.g., <6 GHz) the required cell coverage may be provided by forming a wide sector beam for transmitting DL common channels. However, when a wide sector beam on higher frequencies (e.g., >6 GHz) is utilized, the cell coverage may be reduced with the same antenna gain. Thus, higher antenna gain may be needed to compensate the increased path loss to provide the required cell coverage on the higher frequency bands.

Beamforming is a signal processing technique used in antenna arrays for directional signal transmission/reception. With beamforming, a beam may be formed by combining elements in a phased array of antennas in such a way that signals at particular angles experience constructive interference while others experience destructive interference. Different beams may be utilized simultaneously using multiple arrays of antennas. To increase the antenna gain over a wide sector beam, larger antenna arrays (e.g., the number of antenna elements ranging from tens to hundreds) may be used to form high gain beams.

Nonetheless, the beam width of high gain beams may be narrow compared to a wide sector beam so multiple beams for transmitting DL common channels may be needed to cover the required cell area. The number of concurrent high gain beams that an access point is able to form may be limited by the cost and complexity of the utilized transceiver architecture. In practice, on higher frequencies, the number of concurrent high gain beams may be much less than the total number of beams required to cover the cell area. In other words, the access point is able to cover only part of the cell area by using a subset of beams at any given time.

As a consequence, a BS (e.g., gNB) may utilize multiple beams to cover the whole coverage area and each UE may be associated with one of those beams. When a UE moves and/or the environment varies, the best beam for the UE may change. The Layer 1 (L1)/Layer 2 (L2) beam management procedure (or L1/L2 inter-beam mobility management procedure) may be used to switch the current beam of a UE to a new beam. The beam may be used on a DL control channel. The design of beam may be related to the coverage distance and the robustness to UE mobility. Considering the low data rate requirement but high reliability requirement on the control channel, the beam may need to be wide enough to allow reasonable UE mobility and potential blockage. Choosing narrow beams may generate unnecessary frequent beam switching and potentially frequent connection loss on the control channel.

However, the misalignment on beam may result in the loss of ongoing link of the control channel (which may be referred to as "beam failure (event)"). In this condition, the gNB may not be able to use the same beam management procedure to switch to a new beam. Thus, the BFR mechanism may be utilized. The BFR mechanism may be applied by a UE.

A UE may detect a beam failure event by measuring certain DL RS(s), control channel(s) and/or data channel(s). For example, during the beam failure detection, a UE may detect a very low Reference Signal Received Power (RSRP) of the current serving beam based on the measurement of the DL RS used for beam management. If beam failure is detected, the UE may notify the gNB of the beam failure event through certain UL transmission(s). Then the gNB may act (e.g., change the serving beam) accordingly.

A UE may be configured with a BFR procedure during which the UE may inform the serving gNB of a new Synchronization Signal Block (SSB) or a Channel State Information Reference Signal (CSI-RS) when beam failure is detected on the serving SSB(s)/CSI-RS(s). For Beam Failure Detection (BFD), the gNB may configure the UE with BFD RS(s) (e.g., SSB(s) or CSI-RS(s)), and the UE may declare/detect beam failure when the number of beam failure instance indications from the Physical (PHY) layer reaches a configured threshold before a configured timer expires. An SSB-based BFD procedure may be performed based on the SSB associated with the initial DL Bandwidth Part (BWP) and may only be configured for the initial DL BWP and for the DL BWP(s) containing the SSB associated with the initial DL BWP. For other DL BWPs, a BFD procedure may only be performed based on CSI-RS.

In some implementations, when beam failure is detected (e.g., on an SpCell), a UE may perform a Random Access Channel (RACH)-based BFR procedure including:

triggering a BFR procedure by initiating a Random Access (RA) procedure on the SpCell; and selecting a suitable beam to perform the BFR procedure (e.g., if the gNB has provided the UE with dedicated RA resources for certain beams, those beams may be prioritized to be selected by the UE).

Upon completion of the RA procedure, the BFR procedure may be considered complete.

In the 3GPP Release 15 (Rel-15), the RACH-based BFR mechanism only may be applied for the SpCell (e.g., a PCell and/or a PSCell). In this condition, if beam blockage and/or beam failure happens on an SCell, a UE may rely on the Network (NW) to handle it. For example, an NW may determine that beam failure is detected on an SCell based on the absence of Acknowledgement (ACK)/Negative Acknowledgement (NACK) feedback for the scheduled DL transmission in the SCell, or depending on the Channel Quality Indicator (CQI) report for the SCell. If beam failure occurs, the NW may release this SCell and re-schedule the data transmission. However, this method may decrease the scheduling efficiency and increase the signaling propagation latency of the higher layer(s), e.g., Radio Resource Control (RRC) layer. In some implementations, in order to quickly recover a beam (e.g., change the serving beam) from the beam failure on the SCell, the signaling configuration and/or the beam failure recovery procedure may be provided to support BFR on SCell.

FIG. 1 illustrates a BFR procedure triggered for an SCell according to an implementation of the present disclosure. As shown in FIG. 1, the BFR procedure triggered for an SCell includes actions 102, 104, 106 and 108. In some implementations, one or more of actions 102, 104, 106 and 108 may be omitted from the BFR procedure triggered for an SCell.

In action 102, a BFD operation may be performed. During the BFD operation, a BFD RS (e.g., an SSB and/or a CSI-RS) may be explicitly or implicitly configured by the BS 184 for the UE 182 to detect a beam failure event. For example, the PHY layer of the UE 182 may measure the radio link quality according to the BFD RS. The PHY layer of the UE 182 may provide a beam failure instance indication to the higher layer (e.g., the Medium Access Control (MAC) entity) when the radio link quality is worse than a threshold within a specific period of time.

From the perspective of the MAC entity of the UE 182, the beam failure event may be detected if the number of (consecutive) detected beam failure instances exceeds a configured maximum number (e.g., beamfailureInstanceMaxCount). In some implementations, the beamfailureInstanceMaxCount may be configured based on a BWP/cell/subset of Cell Group (CG)/CG basis. On the other hand, the UE 182 may use a counter to count the number of beam failure instances from the PHY layer (e.g., BFI_COUNTER). In some implementations, the BFI_COUNTER may be applied based on a BWP/cell/subset of CG/CG basis. In one implementation, the value of the BFI_COUNTER may be reset when a BFD timer (e.g., beamFailureDetectionTimer) maintained at the UE 182 expires. In some implementations, the beamFailureDetectionTimer may be configured based on a BWP/cell/subset of CG/CG basis.

In some implementations, when a beam failure event is detected on an SCell(s), the UE 182 may trigger a BFR procedure for the SCell(s) and/or trigger a SR procedure for BFR.

In action 104, a New Beam Identification (NBI) procedure may be performed. During the NBI procedure, the UE 182 may search for and select a new beam (or "candidate beam") for the SCell(s) (on which the beam failure event is detected) based on the measuring result for the NBI RS. For example, the UE 182 may select a beam of which the L1-RSRP measurement result is higher than a threshold as a candidate beam for the SCell(s).

In action 106, a Beam Failure Recovery reQuest (BFRQ) operation may be performed. During the BFRQ operation, the UE 182 may transmit a BFR-Scheduling Request (BFR-SR) over a PCell, a PSCell, and/or an SCell (denoted as action "1A" in FIG. 1). The BFR-SR may be an SR for BFR (e.g., a specific SR indicated by an Information Element (IE) schedulingRequestID-BFR-SCell), which may be used to inform the BS 184 of a beam failure event detected on the SCell(s) and/or to request an UL resource (e.g., to transmit more information about the beam failure event). In some implementations, whether the UE 182 transmits the BFR-SR may depend on whether there is available UL resource(s) (for transmitting the BFR report). For example, the UE 182 may not transmit the BFR-SR if there is available UL resource(s) for the UE to use and/or if there is UL resource(s) can be used for BFR report transmission (e.g., the UL resource(s) can accommodate the BFR report).

In some implementations, if there is UL resource(s) available for BFR report transmission (e.g., the UL resource(s)can accommodate the BFR report), the UE 182 may (directly) transmit a BFR report (e.g., based on a MAC Control Element (CE)) to the BS 184 (denoted as "2A" in FIG. 1). The BFR report may include at least one of the information about the beam failed Component Carrier(s) (CC(s)) and/or beam failed serving cell(s) (e.g., an SpCell and/or SCell) via the Cell index(s), the information about the new beam(s)/candidate beam(s) (e.g., the UE 182 may select the new beam/candidate beam by measuring the NBI RS(s)), and the no-new-beam information. In one implementation, the no-new-beam information may be used to indicate that the UE 182 does not find any (qualified) new beam/candidate beam (e.g., the UE 182 does not find any new beam/candidate beam with the corresponding L1-RSRP higher than a threshold). In one implementation, the BFR report may indicate the presence of new beam/candidate beam. In addition, in some implementations, the BFR report may be transmitted (only) via the UL grant which is requested by the BFR-SR. In some implementations, the BFR report may be transmitted via arbitrary UL grant(s) (e.g., an UL grant provided in a Random Access Response (RAR), a dynamic UL grant provided via a Physical Downlink Control Channel (PDCCH), and/or a configured grant).

In action 108, a BFR response operation may be performed. During the BFR response operation, the UE may attempt to monitor a BFR response (e.g., via PDCCH monitoring) from the BS 184 after transmitting a BFRQ (e.g., a BFR-SR and/or a BFR report). In some implementations, the BFR response may be transmitted on a PCell, a PSCell and/or an SCell. In some implementations, the BFR response may be transmitted on an CC and/or a serving cell on which the UE 182 transmits the BFRQ (e.g., the SCell on the beam failure event is detected). Upon receiving the BFR response, the UE 182 may consider that the BFR procedure triggered for an SCell is completed.

BFR-SR Triggering

A Buffer Status Report (BSR) may be used to provide support for Quality of Service (QoS)-aware packet scheduling. For example, a UE may perform a BSR procedure to transmit a BSR to inform the NW of the amount of data that is buffered in the transmission buffer(s) for a Logical Channel Group (LCG) in the UE. When a BSR procedure is triggered (e.g. when the new data arrives at the transmission buffers of the UE), the UE may further trigger an SR procedure to transmit an SR to the NW if the there is no UL resource(s) available for the UE to transmit the BSR. In NR, the SR procedure may only be triggered by a (regular) BSR procedure. An example Text Proposal (TP) for the UE behavior described above is in Table 1.

TABLE 1

The MAC entity shall:
1> if the Buffer Status reporting procedure determines that at least one BSR has been triggered and not cancelled:
  2> if UL-SCH resources are available for a new transmission and the Uplink Shared Channel (UL-SCH) resources can accommodate the BSR MAC CE plus its sub-header as a result of logical channel prioritization:
    3> instruct the Multiplexing and Assembly procedure to generate the BSR MAC CE(s);
    3> start or restart periodicBSR-Timer except when all the generated BSRs are long or short Truncated BSRs;
    3> start or restart retxBSR-Timer.
  2> if a Regular BSR has been triggered and logicalChannelSR-DelayTimer is not running:
    3> if there is no UL-SCH resource available for a new transmission; or
    3> if the MAC entity is configured with configured uplink grant(s) and the Regular BSR was triggered for a logical channel for which logicalChannelSR-Mask is set to false; or
    3> if the UL-SCH resources available for a new transmission do not meet the LCP mapping restrictions (see subclause 5.4.3.1) configured for the logical channel that triggered the BSR:
      4> trigger a Scheduling Request.

In some implementations, a UE may be configured with one or more SR configurations. The UE may perform an SR procedure based on an SR configuration. Each SR configuration may correspond to one or more Logical Channels (LCHs), where each LCH may be mapped to zero or one SR configuration. An example TP of a configuration of an LCH (e.g., LogicalChannelConfig) is in Table 2.

TABLE 2

```
LogicalChannelConfig ::=      SEQUENCE {
   ul-SpecificParameters      SEQUENCE {
      priority                        INTEGER (1..16),
      prioritisedBitRate              ENUMERATED {kBps0, kBps8, kBps16, kBps32, kBps64, kBps128, kBps256, kBps512,
                                      kBps1024, kBps2048, kBps4096, kBps8192, kBps16384, kBps32768, kBps65536, infinity},
      bucketSizeDuration              ENUMERATED {ms5, ms10, ms20, ms50, ms100, ms150, ms300, ms500, ms1000,
                                      spare7,     spare6,     spare5,     spare4, spare3,spare2, spare1},
      allowedServingCells             SEQUENCE (SIZE (1..maxNrofServingCells-1)) OF ServCellIndex      OPTIONAL,   -- PDCP-CADuplication
      allowedSCS-List                 SEQUENCE (SIZE (1..maxSCSs)) OF SubcarrierSpacing     OPTIONAL,   -- Need R
      maxPUSCH-Duration               ENUMERATED {ms0p02, ms0p04, ms0p0625, ms0p125, ms0p25, ms0p5, spare2, spare1}
OPTIONAL,      -- Need R
      configuredGrantType1Allowed     ENUMERATED {true}                                     OPTIONAL,   -- Need R
      logicalChannelGroup             INTEGER (0..maxLCG-ID)                                OPTIONAL,   -- Need R
      schedulingRequestID             SchedulingRequestId                                   OPTIONAL,   -- Need R
      logicalChannelSR-Mask           BOOLEAN,
      logicalChannelSR-DelayTimerApplied  BOOLEAN,
      ...,
      bitRateQueryProhibitTimer       ENUMERATED {
                                         s0, s0dot4, s0dot8, s1dot6, s3, s6, s12,s30}       OPTIONAL
   -- Need R
   }                                                                                        OPTIONAL,
-- Cond UL
   ...
}
```

SchedulingRequestId: If present, the parameter SchedulingRequestId may indicate the scheduling request configuration applicable for this LCH.

In addition, an example TP of a BSR (procedure) is in Table 3.

TABLE 3

A BSR (procedure) shall be triggered if any of the following events occur:
    UL data, for a logical channel which belongs to an LCG, becomes available to the
    MAC entity; and either
        this UL data belongs to a logical channel with higher priority than the priority of
        any logical channel containing available UL data which belong to any LCG; or
        none of the logical channels which belong to an LCG contains any available UL
        data.
    in which case the BSR is referred below to as 'Regular BSR';
    retxBSR-Timer expires, and at least one of the logical channels which belong to an
    LCG contains UL data, in which case the BSR is referred below to as 'Regular BSR';
[. . .]

NOTE:
When Regular BSR triggering events occur for multiple logical channels simultaneously, each logical channel triggers one separate Regular BSR.

In some implementations, the SR configuration of the LCH that triggers the regular BSR (procedure) (if such a configuration exists) may be considered as the corresponding SR configuration for the triggered SR (procedure). On the other hand, for a regular BSR (procedure) triggered in response to the expiry of a BSR retrasnsmission timer (e.g., retxBSR-Timer), the UE may consider that the LCH that triggered the regular BSR is the highest priority LCH that has the data available for transmission at the time the regular BSR is triggered, so the corresponding SR configuration may be based on this highest priority LCH. Moreover, if the LCH does not map to any SR configuration and also the LCH triggers a BSR (procedure), the UE may initiate an RA procedure to request an UL resource.

Figure 2:
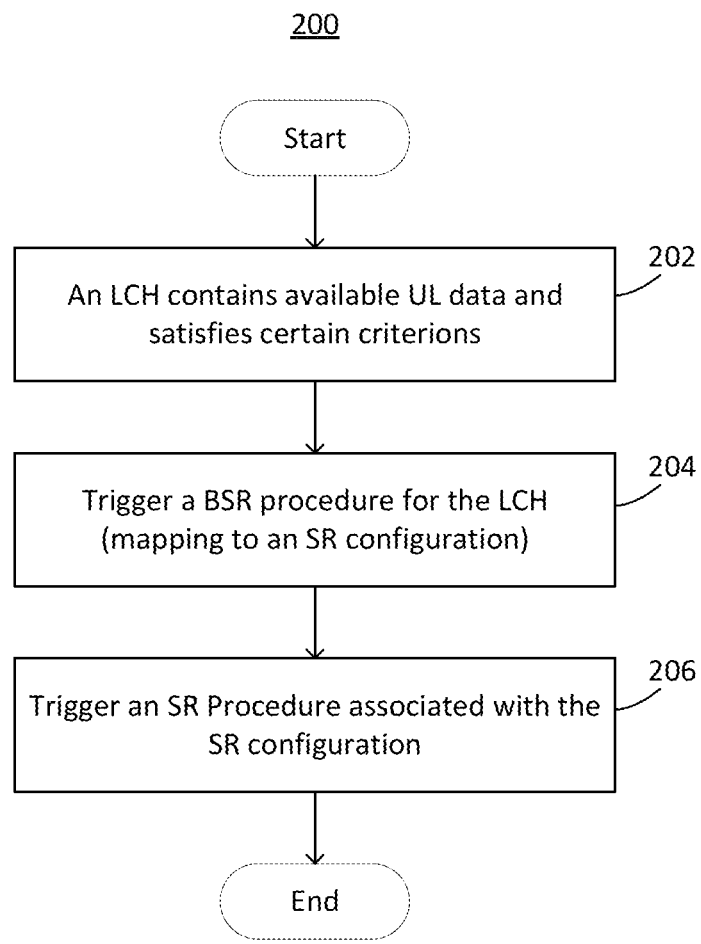
FIG. 2 illustrates an SR triggering procedure according to an implementation of the present disclosure.

FIG. 2 illustrates an SR triggering procedure 200 according to an implementation of the present disclosure. As shown in FIG. 2, in action 202, a UE may determine that an LCH that contains available data satisfies certain criterions. In action 204, the UE may trigger a BSR (procedure) for/by the LCH, where the LCH may map to an SR configuration. In action 206, the UE may trigger an SR (procedure) associated with the SR configuration mapping to the LCH.

In a legacy wireless communication system (e.g., defined by the 3GPP Release-15), an SR procedure may only be triggered by a (regular) BSR procedure, and the (regular) BSR procedure may be only triggered by an LCH that contains the available UL data.

In some implementations, if a beam failure event is detected on an SCell(s), a UE may transmit a BFRQ to let the NW know this condition and/or to provide the related information to the NW for BFR. For example, a UE may transmit a BFR-SR on a Physical Uplink Control Channel (PUCCH) resource to request for an UL resource (e.g., a PUSCH resource) and/or transmit a BFR report via an UL resource. The beam failure event (e.g., detected on an SCell) may be detected by the UE based on the measurements for the BFD RS(s) (e.g., associated with the SCell). For example, the UE may determine that a beam failure event is detected on an SCell(s) when the radio link quality assessed based on the BFD RS(s) is worse than a threshold within a specific period of time. In addition, the UE may trigger a BFR procedure for the SCell(s) if the beam failure event is detected.

In the current NR system, when a beam failure event is detected, no BSR procedure could be triggered if there is no available UL data in the LCH. In this condition, no SR procedure may be triggered either. However, without triggering the SR procedure, a UE may be unable to obtain the UL resource(s) for transmitting the BFR report. Therefore, in some implementations of the present disclosure, an improved SR triggering mechanism for BFR is provided. The SR procedure triggered based on the improved SR triggering mechanism for BFR may be referred to as an "BFR-SR procedure" or an "SR procedure for BFR" in the present disclosure. The UE may transmit a BFR-SR (or an "SR for BFR") during a BFR-SR procedure.

In some implementations, a BFR-SR procedure may be triggered if at least one of the following conditions (a1)-(a11) is satisfied:

(a1) when a beam failure event (e.g., for an SCell) has been detected;

(a2) when a BFR procedure (for an SCell) has been initiated/triggered (and not cancelled):
    since the beam failure event is detected at the UE side, the NW may not know that the beam failure event occurs without any information from the UE. The BFR-SR may be used to inform the NW (e.g., a BS) that the beam failure event is detected and to request the NW for an UL resource to transmit a BFR report. Thus, when a beam failure event is detected and/or a BFR procedure has been triggered (and not cancelled), the UE may trigger a BFR-SR procedure accordingly. In some implementations, the BFR-SR procedure may be triggered without regard to whether there is available UL resource(s). In some implementations, the BFR-SR procedure may be triggered based on whether a beam failure event is detected. In some implementations, the BFR-SR procedure may be triggered based on whether a BFR procedure is triggered.

(a3) if no UL resource is allocated for new transmission:
    in some implementations, the BFR-SR may be used to request for an UL grant to transmit the BFR-related information (e.g., a BFR report). Thus, the BFR-SR may be triggered if there is no available UL resource(s) for new transmission. On the contrary, if the UE has the UL resource(s) available for transmitting the BFR report, the UE may not need to trigger the BFR-SR procedure and/or transmit the BFR-SR. In some implementations, the UL resource may be provided by a dynamic grant, a configured grant, and/or an UL grant in an RAR. In some implementations, a BFR-SR procedure may be triggered by the UE based on whether there is available UL resource (for new transmission). In some implementations, the UE may consider that the UL resource is allocated when the MAC entity has an active configuration for either type of configured UL grants, or if the MAC entity has received a dynamic UL grant, or if both conditions are met.

(a4) if the UE is allocated with UL resources for a new transmission, but the UL resource cannot accommodate the BFR report (as a result of Logical Channel Prioritization (LCP)):
    since even if there is an available UL resource, if the BFR report is not able to be included in the UL resource (e.g., based on the LCP procedure), the UE may need to further request more UL resources to accommodate the BFR report (e.g., a larger size UL resource). In this sense, the UE may determine whether to trigger a BFR-SR procedure by further considering whether the available UL resource(s) cannot accommodate the BFR report (or BFR MAC Control Element (CE)). In some implementations, when the UE performs a new transmission, the LCP procedure may be applied. The UE may generate a MAC Protocol Data Unit (PDU) by including the MAC CEs and/or data based on their respective priority (e.g., priority value/index). The available UL resource may be unable to accommodate the BFR report when the MAC PDU cannot include the (complete) BFR report (or BFR MAC CE). For example, the size of the MAC PDU may be determined based on the space of the UL resource. More specifically, the BFR report may include a MAC CE and a sub-header.

(a5) if the UE is allocated with UL resources for a new transmission, but the UL resource is not allowed to be used for transmitting the BFR report:

in some implementations, a UE may be configured with one or more LCP restrictions for using the UL resource, e.g., allowedSCS-List, maxPUSCH-Duration, configuredGrantType1Allowed, allowedServingCells, etc. When an LCP procedure is applied for a new transmission, the MAC CEs and/or data may be restricted to use the UL resource. Therefore, the UE may not use the available UL resource to transmit the BFR report since the UL resource may not satisfy certain LCP restrictions. In this condition, the UE may need to trigger a BFR-SR procedure to request for another UL resource. In one implementation, the beam failure event may be a critical event which is needed to be resolved as soon as possible, since the UE may not perform data transmission, e.g., on a CC, when beam failure event happens due to bad link quality. If the UL resource does not satisfy the delay requirement of BFR reporting, e.g., if the PUSCH duration (maxPUSCH-Duration) of the UL resource is too long, the UE may not use this UL resource for BFR reporting. A BFR-MAC-CE-specific PUSCH duration (e.g., maxPUSCH-Duration) may be preconfigured per BFR configuration. For example, if an UL grant for a PUSCH transmission is received, the MAC entity of the UE may (only) multiplex the BFR MAC CE into a MAC PDU corresponding to the PUSCH transmission once the time duration of the PUSCH transmission satisfies the BFR-MAC-CE-specific PUSCH duration (e.g., maxPUSCH-Duration) restriction. The UE may trigger a BFR-SR procedure to request for another UL resource in this situation. In some implementations, if the UE is allocated with UL resources for a new transmission, the UE may determine whether to trigger the BFR-SR procedure based on certain restriction(s) (e.g., LCP restriction(s)) for the UL resources. In one implementation, a BFR report may only be transmitted on a specific UL resource that implicitly or explicitly indicates specific information. If an UL resource does not indicate the specific information, the UL resource may not be allowed to be used in BFR reporting.

(a6) if the UE is allocated with UL resources for a new transmission, but the UL resource is (only) allocated on a cell where a beam failure event has been detected:

in some implementations, a UE may be allocated with UL resources for a new transmission. However, the UL resource may be allocated (only) on a cell where a beam failure event has been detected. For example, the UL resource may be scheduled by a dynamic grant via the Downlink Control Information (DCI), wherein the DCI may include the cell information (e.g., a cell index, a carrier indicator, etc.). For example, the UL resource may be a configured UL resource, wherein the configured UL resource may be configured on a cell where a beam failure event has been detected. For example, the UL resource may be cross-cell scheduled. For example, the DCI/PDCCH may be received by the UE on a first cell, and the UL resource (e.g., the PUSCH resource indicated by the DCI) may be scheduled on a second cell on which a beam failure event has been detected. In some implementations, the UL resource may be provided by a dynamic grant, a configured grant, and/or an UL grant in the RAR.

(a7) if no other BFR procedure is ongoing:

in some implementations, the other BFR procedure may be a RACH-based BFR procedure (e.g., a beam failure event happens on a PCell or a PSCell) or another BFR procedure triggered for an SCell (e.g., a beam failure event happens on another SCell(s). Since the BFR-SR may be transmitted on the PUCCH resource of the PCell or the PSCell, if the other BFR procedure is a RACH-based BFR procedure, it may imply that the DL and/or UL transmission on the PCell or the PSCell may not be qualified. Thus, the UE may stop attempting to perform BFR-SR transmission(s) in this situation. In another situation, if the other BFR procedure is a BFR procedure triggered for an SCell, it may imply that the BFR-SR procedure has been triggered by a UE and not cancelled, so the UE may not need to trigger another BFR-SR procedure in this situation. For example, the UE may trigger a BFR-SR procedure when there is no other ongoing BFR procedure.

(a8) if no other BFR-SR is pending:

in some implementations, after an BFR-SR procedure is triggered by a UE, the BFR-SR procedure may be considered as "pending" until it is cancelled. Since multiple BFR-SR procedures may correspond to the same configuration (e.g., there is only one configuration of PUCCH resource for each BFR-SR procedure), the UE may not trigger multiple BFR-SR procedures at a time. On the other hand, for the BFRQ transmission, the UE may report the corresponding beam failure information via the BFR report (e.g., the action 2A in FIG. 1). The BFR report may include the beam failure information for more than one CC. Thus, even if the beam failure event on a second CC happens after the UE triggers a BFR-SR procedure for a first CC, the UE may include the beam failure information for both the first CC and the second CC in the same BFR report. In some implementations, the UE may not trigger a BFR-SR procedure if there is a pending BFR-SR at the UE. In some implementations, the UE may not trigger multiple BFR-SR procedures at the same time (e.g., in the same symbol/slot/subframe/frame).

(a9) if no other BFR-SR associated with the same BFR-SR configuration is pending:

in some implementations, a UE may be configured with multiple BFR-SR configurations, where each BFR-SR configuration may be associated with a set of cells. For example, a first BFR-SR configuration may be associated with SCell 1 and SCell 2, and a second BFR-SR configuration may be associated with SCell 3 and SCell 4. Each BFR-SR configuration may include its BFD RS(s). If a first beam failure event is detected based on a first BFD RS(s) of the first BFR-SR configuration, the UE may trigger a first BFR-SR procedure. Meanwhile, if a second beam failure event is detected based on a second BFD RS(s) of the second BFR-SR configuration, the UE may trigger a second BFR-SR procedure for the second beam failure event. In this condition, the UE may trigger the first BFR-SR procedure and the second BFR-SR procedure simultaneously (e.g., triggering one of the first and second BFR-SR procedures when/after the other of first and second BFR-SR procedures is triggered). However, if a third beam failure event is detected based on the BFD RS(s) associated with the first BFR-SR configuration, since the BFR-SR procedure of the first BFR-SR configuration is still pending, the UE may not trigger the BFR-SR for the third beam failure event.

When the BFR-SR timer is not running, the UE may not transmit the BFR-SR (even if the BFR-SR procedure for the BFR-SR is pending). When the BFR-SR timer is running, the corresponding BFR-SR procedure may be considered as pending. In one implementation, if the UE detects a first beam failure event on a first SCell(s), the UE may trigger a BFR-SR procedure, and the corresponding BFR-SR timer may start running. If the UE detects a second beam failure event on a second SCell(s), the UE may not trigger another BFR-SR when the BFR-SR timer is running. The UE may determine whether to trigger a BFR-SR procedure based on whether any BFR-SR timer is running.

An example TP of the UE behavior for triggering BFR-SR procedure is in Table 4.

TABLE 4

Example

The MAC entity of the UE may:
   1> if beam failure instance indication (for an SCell(s)) has been received from lower layers:
      2> start or restart the beamFailureDetectionTimer (for an SCell(s));
      2> increment BFI_COUNTER (for an SCell(s)) by 1;
      2> if BFI COUNTER (for an SCell(s)) >= beamFailureInstanceMaxCount:
         3> initiate/trigger a BFR procedure (for an SCell(s)); //Note: beam failure event (for an SCell(s)) is detected
The MAC entity of the UE may:
   1> if the BFR procedure (for an SCell(s)) determines that at least one BFR has been triggered and not cancelled:
      2> if there is no UL-SCH resource available for a new transmission; and/or
      2> if UL-SCH resources are available for new transmission, but the UL-SCH resources cannot accommodate the BFR report;
         3> trigger a BFR-SR procedure.

(a10) if the UE has valid PUCCH resource for BFR-SR:
in some implementations, a UE may be configured with a valid PUCCH resource for BFR-SR transmission. If the UE has valid PUCCH resource for BFR-SR transmission, the UE may transmit the BFR-SR on the valid PUCCH resource in order to request for a PUSCH resource. However, if the UE does not have any valid PUCCH resource, the UE may use other methods to request for the PUSCH resource, e.g., initiating a RA procedure, performing certain fallback mechanism, etc. In some implementations, if the valid PUCCH resource is released, the valid PUCCH resource may become invalid. In some implementations, if the BFR-SR has been transmitted for a number of times (e.g., counted by a counter) or for a period of time (e.g., determined based on a timer), the UE may release the PUCCH resource for BFR-SR. In some implementations, the UE may release the PUCCH resource for all serving cells when a time alignment timer associated with a Primary Timing Advance Group (PTAG) expires. In some implementations, the UE may release the PUCCH resource for all serving cells belonging to a Timing Advance Group (TAG) when a time alignment timer associated with the TAG expires. In some implementations, the UE may release the PUCCH resource on an SCell when the SCell is deactivated.

(a11) if no BFR-SR timer is running:
in some implementations, a BFR-SR timer may be used to control the BFR-SR transmission. For example, when the BFR-SR timer is running, the UE may transmit the BFR-SR on a valid PUCCH resource for the BFR-SR.

Referring to FIG. 1, the action 2A is that a UE transmits a BFR report. In some implementations, the BFR report may include the detailed information of the detected beam failure condition, e.g., failed CC, new beam information, etc. However, in order to carry more information about the detected beam failure condition, it may be hard to use a pre-configured dedicated UL resource (e.g., a PUCCH resource) to transmit such information, since it may waste too many resources. Therefore, in some implementations, the BFR report may be transmitted through MAC CE(s), which may be transmitted via the PUSCH resource. By this way, the UE may need to determine when to generate the BFR report. In some implementations, a BFR report may include a BFR MAC CE and the sub-header of the BFR MAC CE.

In some implementations, a BFR report (e.g., including a BFR MAC CE and the sub-header of the BFR MAC CE) may be generated when at least one of the following conditions (b1)-(b6) is satisfied:

(b1) when a beam failure event (for an SCell) is detected;

(b2) when a BFR procedure (for an SCell) is initiated, and/or when a BFR procedure has been initiated/triggered and not cancelled;

(b3) when a BFR-SR procedure is triggered and/or when a BFR-SR procedure is pending;

(b4) if the UL resource(s) is available for a new transmission;

(b5) if the UL resource(s) is able to accommodate the BFR report (plus the sub-header of the BFR report as a result of LCP); and (b6) if the UL resource(s) is allowed to be used for the transmission of the BFR report (e.g., based on certain indication(s) or restriction(s)).

In some implementations, if a BFR procedure is triggered, the UE may determine whether to generate the BFR report based on whether there is an available UL resource(s). If the UE has the UL resource(s) available for a new transmission and the UL resource(s) is able to accommodate the BFR report, the UE may generate the BFR report. If there is no UL resource available for a new transmission, the UE may trigger a BFR-SR procedure.

In some implementations, if a BFR procedure is triggered, the UE may trigger a BFR-SR procedure, and the UE may determine whether to generate the BFR report based on whether there is an available UL resource(s). If the UE has the UL resource(s) available for a new transmission and the UL resource(s) is able to accommodate the BFR report, the UE may generate the BFR report. In addition, the UE may cancel the BFR-SR procedure when the BFR report is generated.

In some implementations, the UL resource(s) may be considered available if the MAC entity of the UE has an active configuration for either type of configured UL grants, or if the MAC entity has received a dynamic UL grant, or if both of the conditions described above are met.

In some implementations, the UL resource(s) may be provided by a dynamic grant, a configured grant, and/or an UL grant in an RAR.

In some implementations, the UE may only use a specific UL resource for transmitting the BFR report. The specific UL resource may be provided by a specific UL grant. For example, the specific UL grant may include a specific indicator to indicate this UL grant is used for transmitting a BFR report. The specific UL grant may have a specific size of resource. For example, the specific size may have the same size as the BFR report (e.g., a BFR MAC CE including its sub-header). The scheduling (e.g., via a PDCCH) of the UL grant may be sent at a specific timing. For example, the specific timing may be after the BFR-SR transmission, within a specific window, or when a specific timer is running (the specific timer may be started when the BFR-SR is transmitted). For example, the specific timing may be the first UL grant received after the UE triggers the BFR-SR procedure or after the UE transmits the BFR-SR. The specific UL resource(s) may have a specific PUSCH duration in the time domain. For example, the PUSCH duration of the specific UL resource(s) may be lower than a threshold. The specific UL resource(s) may map to a specific cell (e.g., the specific UL resource(s) may be allocated on a specific cell).

In some implementations, the specific UL resource(s) may be implicitly or explicitly indicated by the NW/BS for a BFR purpose. In this condition, the specific UL resource(s) may only be used to transmit the BFR report. In some implementations, the specific UL resource(s) may be scheduled via a specific UL grant, where the specific UL grant may indicate the information that the UL resource(s) is for BFR (purpose). For example, the UL grant may be scheduled by the DCI scrambled with a specific type of Radio Network Temporary Identifier (RNTI). For example, the UL grant may be scheduled by the DCI with a specific DCI format. For example, the UL grant may be scheduled by the DCI with a specific field to indicate the specific information, e.g., for BFR purpose.

In some implementations, the specific UL grant may be scheduled by a specific PDCCH, where the specific PDCCH may be monitored by the UE on a specific search space/ Control Resource Set (CORESET). In some implementations, the UE may monitor the specific search space/CORESET to receive the UL grant for the BFR report. In some implementations, the UE may monitor the specific search space/CORESET on an SpCell or an SCell. In some implementations, the specific search space/CORESET may be configured via the configuration for a (SCell) BFR procedure. In some implementations, the specific search space/ CORESET may be associated with a specific search space Identity (ID) or a specific CORESET ID. In some implementations, when the UE transmits a BFR-SR, the UE may monitor a PDCCH on the specific search space/CORESET (to receive the UL resource). In some implementations, when the UE transmits a BFR report, the UE may monitor a PDCCH on the specific search space/CORESET (to receive the BFR response). In some implementations, the specific search space/CORESET (e.g., recoverySearchSpace) may be used for receiving the BFR response.

In some implementations, the UL resource(s) for BFR report transmission may satisfy one or more of the following specific conditions in an LCP procedure: the allowed SCS list (allowedSCS-List), the maximum PUSCH duration (maxPUSCH-Duration), the allowed configured grant type (configuredGrantType1Allowed), and the allowed serving cells (allowedServingCells). If the UL resource satisfies the specific condition(s), the UE may generate the BFR report and transmit the BFR report via the UL resource. In contrast, if the UL resource does not satisfy any one of the specific condition(s), the UE may not generate the BFR report. The specific condition(s) may be configured in the configuration of the BFR-SR procedure or the configuration of the BFR procedure triggered for an SCell.

In some implementations, the UL resource(s) may be associated with a specific UL configured grant configuration (e.g., configuration ID or type1/type2). For example, the specific UL configured grant configuration may be configured for BFR report transmission. If the available UL resource is a configured grant that maps to a specific configured grant configuration, the UE may generate the BFR report and transmit the BFR report via the UL resource.

In some implementations, the UL resource(s) may be considered available if this UL resource(s) is not allocated in a cell where a beam failure event has been detected, a BSR-SR procedure has been triggered and not cancelled, or a BFRQ confirmation procedure has been triggered and not cancelled.

In some implementations, a BFR procedure may be triggered based on a cell basis or based on a group of cells basis. This kind of BFR procedure may be referred to as a per-cell (or a group of cells) BFR procedure. For example, the per-cell (or a group of cells) BFR procedure of a specific cell (or a specific group of cells) may be triggered if at least one of the following conditions (c1) and (c2) is satisfied. The UE may cancel the triggered per-cell (or a group of cells) BFR procedure of a specific cell (or a specific group of cells) when certain conditions are met, e.g., when a BFR report which contains BFR-related information of that specific cell (or a specific group of cells) is transmitted by the UE.

(c1) when a beam failure event (for an SCell) has been detected on a specific cell (or a specific group of cells); and (c2) when a BFR procedure (for an SCell) has been initiated on the specific cell (or a specific group of cells).

In one implementation, the MAC entity may further determine whether to instruct the PHY layer to transmit a BFR-SR based on the presence of a triggered per-cell (or a group of cells) BFR procedure. In some implementations, the BFR procedure of a specific SCell may be triggered based on whether a beam failure event is detected in the specific SCell (or a specific group of cells). In some implementations, the BFR procedure of a specific SCell may be triggered based on whether a BFR procedure is triggered in the specific SCell (or a specific group of cells),In one implementation, the per-cell BFR procedure corresponding to the SCell with the index i may be triggered when a beam failure event has been detected on the SCell with the index i and/or when the BFR procedure has been initiated on the SCell with the index i. The UE may cancel the triggered per-cell BFR procedure corresponding to the index i when certain condition(s) is met, e.g., when a BFR report (MAC CE) which contains BFR-related information of cell i is transmitted.

In one implementation, the BFR procedure for a group of cells corresponding to the first SCell with the index i and the second SCell with index j may be triggered when a beam failure event has been detected on the first SCell with the index i and/or the second SCell with the index j, and/or when the BFR procedure has been initiated on the SCell with index i and/or j. The UE may cancel the triggered per-cell BFR procedure corresponding to the index i and/or the index j when certain condition(s) is met, e.g., when a BFR report which contains BFR-related information of the cell i and/or the cell j is transmitted. In some implementations, the MAC entity of a UE may instruct the PHY layer to transmit a BFR-SR if at least one of the following conditions (d1)-(d7) is satisfied.

(d1) a BFR procedure has been triggered and not cancelled;

(d2) if the UL resource(s) allocated to the UE is not available for a new transmission;

(d3) if the UL resource(s) allocated to the UE is unable to accommodate the BFR report (plus its sub-header as a result of LCP);

(d4) if the UL resource(s) allocated to the UE is not allowed to be used for BFR reporting (e.g., based on certain indication(s) or restriction(s));

(d5) if the UE has a valid PUCCH resource for BFR-SR transmission;

(d6) if no other BFR procedure is ongoing at the UE:
in some implementations, the other BFR procedure may be a RACH-based BFR procedure (e.g., a beam failure event happens on a PCell or a PSCell) or another PUCCH-based BFR procedure (e.g., a beam failure event happens on another SCell). Since the BFR-SR may be transmitted on the PUCCH resource of a PCell or a PSCell, if there is another ongoing RACH-based BFR procedure at the UE, it may imply that the DL and/or UL transmission on the PCell or the PSCell is not qualified, so the MAC entity of the UE may not instruct the PHY layer to transmit a BFR-SR in this case. In some implementations, if there is another ongoing PUCCH-based BFR procedure at the UE, it may imply that the MAC entity has already instructed the PHY layer to transmit a BFR-SR due to the BFD on another SCell. Since the PUCCH resource may be not dedicated to a specific SCell, the MAC entity may not have to reinstruct the PHY layer to transmit BFR-SR. In some implementations, the UE may trigger the BFR-SR procedure only when there is no other BFR procedure is ongoing at the UE.

(d7) if the BFR-SR timer is not running:
in some implementations, a BFR-SR timer may be used to let the UE perform certain fallback mechanism(s), e.g., an RA procedure, if the UE does not receive any response from the NW during a specific period of time after the transmission of the BFR-SR. For example, when the BFR-SR timer expires, the UE may initiate an RA procedure. This timer may be started upon transmission of a BFR-SR. In this sense, the MAC entity may not instruct the PHY layer to transmit a BFR-SR again if the BFR-SR timer has been already running. In some implementations, the MAC entity may determine whether to inform the PHY layer to transmit a BFR-SR based on whether the BFR-SR timer is running. For example, if the BFR-SR timer is running, the MAC entity may instruct the PHY layer to transmit a BFR-SR on each PUCCH resource valid for the transmission of the BFR-SR. In another example, if the BFR-SR timer has been started, the MAC entity may instruct the PHY layer to start transmitting a BFR-SR on a PUCCH resource valid for the transmission of the BFR-SR. The MAC entity my instruct the PHY layer to stop transmitting the BFR-SR when the BFR-SR timer is stopped or expires.

In one implementation, if the BFR procedure has been triggered and is not cancelled, the MAC entity may need to determine whether to instruct the PHY layer to transmit a BFR-SR based on whether the UE is allocated with available UL resource(s) for a new transmission. If the UE is not allocated with the UL resource(s) available for a new transmission, the MAC entity may instruct the PHY layer to perform the BFR-SR transmission.

In one implementation, if a BFR procedure has been triggered and is not cancelled, the MAC entity may indicate the PHY layer to transmit a BFR-SR. The UE may determine whether to generate the BFR report (e.g., a MAC CE) based on if there is available UL resource allocated to the UE.

In one implementation, the MAC entity may instruct the PHY layer to transmit the BFR-SR if a BFR procedure has been triggered and is not cancelled. The UE may not have an UL resource dedicated to the transmission of a BFR report (e.g., a MAC CE).

In one implementation, if a BFR procedure has been triggered and not cancelled, the MAC entity may indicate the PHY layer to transmit one or multiple BFR-SRs. In addition, the UE may determine whether to generate the BFR report (e.g., a MAC CE) based on if there is available UL resource(s) allocated to the UE. If there is UL resource(s) available for a new transmission and the UL resource(s) is able to accommodate the BFR report (MAC CE), the UE may generate the BFR report (MAC CE). In some implementations, the UE may cancel the BFR procedure when the BFR report (MAC CE) is generated. In some implementations, the UE may stop transmitting the BFR-SR when the BFR report (MAC CE) is generated.

In some implementations, the UL resource(s) may be associated with a specific UL configured grant configuration (e.g., configuration ID or type1/type2). For example, the specific UL configured grant configuration may be configured for a BFR report transmission. If the available UL resource allocated to the UE is a configured grant which maps to a specific configured grant configuration, the UE may generate the BFR report and transmit the BFR report via the UL resource. The BS (e.g., gNB) may indicate, via the RRC or DCI signalling, that the configured grant configuration is a specific configured grant configuration.

In some implementations, an UL resource may be considered available if the UL resource is not allocated in a cell where a beam failure event has been detected, a cell where a BSR-SR procedure has been triggered and not cancelled, or a cell where a BFR procedure has been triggered and not cancelled.

In some implementations, the UE may not use the UL resource(s) which is allocated on a cell where a beam failure event has been detected. In one implementation, the UE may detect a beam failure event on a first cell and perform a BFR procedure. The UE may receive an UL resource which is allocated on the first cell. The UE may not use the UL resource on the first cell for BFR report transmission. In some implementations, the UL resource may be scheduled by a dynamic grant via DCI, wherein the DCI may include cell information (e.g., a cell index, a carrier indicator, etc.). In some implementations, the UL resource may be a configured UL resource, wherein the configured UL resource may be configured on a cell where a beam failure event has been detected. In some implementations, the UL resource may be cross-cell scheduled. For example, the DCI/PDCCH may be received on a first cell, and the UL resource (e.g., a PUSCH resource) may be scheduled on a second cell where the beam failure event has been detected.

In some implementations, the UE may not use an UL resource by ignoring/skipping the UL resource and/or the corresponding UL grant.

BFR-SR Transmission Restriction

In some implementations, while using the "BFR-SR triggering" approach described above (e.g., based on the SR procedure for BFR) to perform an SCell BFR procedure, a triggered BFR-SR may be considered as pending until it is cancelled. When the BFR-SR procedure is pending, the UE may keep signaling/transmitting the BFR-SR on a PUCCH resource valid for BFR-SR transmission since the UE may not successfully get an available UL resource for transmitting a BFR report through only a few BFR-SR transmissions. In some implementations, only the PUCCH resource on a BWP which is active during the BFR-SR transmission may be considered valid (for the BFR-SR transmission).

In some implementations, the PHY layer may keep signaling/transmitting the BFR-SR on the PUCCH resource valid for BFR-SR transmission after being instructed by the MAC, since the UE may not successfully get an available UL resource for transmitting a BFR report through only a few BFR-SR transmissions. In some implementations, only the PUCCH resource on a BWP which is active during the BFR-SR transmission occasion may be considered valid (for the BFR-SR transmission).

However, the radio quality between the UE and the NW may be poor, and the UE may fail to transmit the BFR-SR for a period of time (e.g., the UE may transmit the BFR-SR several times, but the UE still does not receive any available UL resource(s)). Thus, in some implementations, approaches are provided to restrict the BFR-SR transmission. At least one of the following approaches (Approach 1 and Approach 2) may be used.

Approach 1—Timer-Based

In some implementations, a specific timer (e.g., a "BFR-SR timer") may be used to control the BFR-SR transmission. For example, when the BFR-SR timer is running, the UE may transmit the BFR-SR on a valid PUCCH resource for BFR-SR (e.g., a PUCCH resource that is valid for a BFR-SR transmission). When the BFR-SR timer is not running, the UE may not transmit the BFR-SR (even if the corresponding BFR-SR procedure is pending). When the BFR-SR timer is running, the corresponding BFR-SR procedure may be considered as pending. When the BFR-SR timer expires, the corresponding BFR-SR procedure and/or the corresponding BFR procedure may be cancelled.

In some implementations, the BFR-SR timer may be started or restarted when at least one of the following conditions (e1)-(e5) is satisfied:

(e1) the BFR-SR procedure corresponding to the BSR-SR timer is triggered;

(e2) the BFR procedure (for an SCell) corresponding to the BSR-SR timer is initiated;

(e3) the beam failure event (for an SCell) is detected;

(e4) the active BWP is switched/deactivated; and (e5) the MAC entity instructs the PHY layer to perform the BFR-SR transmission.

In some implementations, the BFR-SR timer may be stopped when at least one of the following conditions (f1)-(f12) is satisfied:

(f1) the triggered BFR-SR procedure corresponding to the BSR-SR timer is cancelled;

(f2) the BFR procedure (for an SCell) corresponding to the BSR-SR timer is cancelled;

(f3) the BFR procedure (for an SCell) corresponding to the BSR-SR timer is completed;

(f4) the BFR-SR configuration corresponding to the BSR-SR timer is reconfigured;

(f5) any configuration of the BFR configuration (for an SCell) is reconfigured (e.g., a counter, a timer, etc.);

(f6) the corresponding UL resource for BFR-SR, the corresponding UL resource for BFD RS and/or the corresponding UL resource for NBI RS is reconfigured;

(f7) another BFR procedure (for an SpCell or another SCell) is triggered;

(f8) the corresponding SCell(s) is deactivated;

(f9) transmission of a MAC PDU, where the MAC PDU may include a BFR report (e.g., a MAC CE) plus its sub-header (for an SCell);

(f10) transmission of a MAC PDU, where the MAC PDU may include a BFR report (e.g., MAC CE) that includes all SCells that detect a beam failure event before the MAC PDU assembly;

(f11) cancellation of a BFR procedure; and (f12) the (active) BWP is switched/deactivated.

In some implementations, when the BFR-SR timer expires, the UE may perform at least one of the following operations (g1)-(g5):

(g1) cancelling the corresponding BFR-SR procedure (e.g., cancelling a pending BFR-SR procedure);

(g2) cancelling the BFR procedure (for an SCell);

(g3) initiating another BFR procedure (e.g., for an SpCell);

(g4) initiating an RA procedure (on the SpCell); and (g5) deactivating the corresponding SCell(s).

In some implementations, the BFR-SR timer may be configured by the RRC. For example, the BFR-SR timer may be included in a BFR-SR configuration, or included in a configuration for BFR of SCell(s).

In some implementations, the unit of the BFR-SR timer may be millisecond, slot, symbol, periodicity of transmission of the BFR-SR, or the periodicity of occurrence of the resource for BFR-SR.

In some implementations, another specific timer (which is referred to as a "BFR-SR prohibit timer") may be used to control the BFR-SR transmission in an opposite way. For example, when the BFR-SR prohibit timer is running, the UE may not transmit the BFR-SR on a valid PUCCH resource for BFR-SR (even if the corresponding BFR-SR procedure is pending). When the BFR-SR prohibit timer is not running, the UE may transmit the BFR-SR.

In some implementations, the BFR-SR prohibit timer may be started or restarted when at least one of the following conditions (h1) and (h2) is satisfied:

(h1) the corresponding BFR-SR is transmitted; and (h2) the BFR-SR is transmitted and the BFR-SR prohibit timer is not running.

In some implementations, the BFR-SR prohibit timer may be stopped when at least one of the following conditions (i1)-(i10) is satisfied:

(i1) the BFR procedure (for an SCell) corresponding to the BFR-SR prohibit timer is cancelled;

(i2) the BFR procedure (for an SCell) corresponding to the BFR-SR prohibit timer is completed;

(i3) the BFR-SR configuration corresponding to the BFR-SR prohibit timer is reconfigured;

(i4) any configuration of the BFR configuration (for an SCell) is reconfigured (e.g., a counter, a timer, etc.);

(i5) the corresponding UL resource for BFR-SR, the corresponding UL resource for BFD RS and/or the corresponding UL resource for NBI RS is reconfigured;

(i6) another BFR procedure (for an SpCell or an SCell) is triggered;

(i7) the (active) BWP is switched/deactivated;

(i8) the SCell(s) corresponding to the BFR-SR prohibit timer (e.g., the UE triggers the BFR procedure on the SCell(s) and performs the BFR-SR prohibit timer for this BFR procedure.) is deactivated;

(i9) transmission of a MAC PDU that includes a BFR report (MAC CE) plus its sub-header (for an SCell); and (i10) transmission of a MAC PDU that includes a BFR report (MAC CE) which includes all SCells which detect a beam failure event before the MAC PDU assembly.

Approach 2—Counter-Based

In some implementations, a specific counter (which is referred to as a "BFR-SR counter") may be used to control the BFR-SR transmission. For example, the UE may use the BFR-SR counter to count how many times the BFR-SR is transmitted. The NW may configure a UE with a maximum number for the BFR-SR counter. When the UE transmits a BFR-SR, the UE may increase the BFR-SR counter by 1.

If the BFR-SR counter reaches to the maximum number, the UE may perform at least one of the following operations (j1)-(j9):

(j1) cancelling the corresponding BFR-SR procedure (e.g., a pending BFR-SR procedure);

(j2) cancelling the BFR procedure (for an SCell);

(j3) initiating another BFR procedure (e.g., for an SpCell);

(j4) initiating a RA procedure (on the SpCell);

(j5) releasing a PUCCH (for the corresponding SCell(s) or for all Serving Cells);

(j6) releasing a Sounding Reference Signal (SRS) (for the corresponding SCell(s) or for all Serving Cells);

(j7) clearing a configured DL assignment and/or an UL grant (of the corresponding SCell(s) or for all Serving Cells);

(j8) clearing a PUSCH resource for semi persistent CSI reporting; and (j9) deactivating the corresponding SCell(s).

In some implementations, the BFR-SR counter may be reset when at least one of the following conditions (k1)-(k10) is satisfied:

(k1) if a reset of the MAC entity of the UE is requested by the upper layer(s) of the UE (e.g., the RRC layer);

(k2) the BFR-SR configuration corresponding to the BFR-SR counter is reconfigured;

(k3) any configuration of the BFR configuration (for an SCell) is reconfigured (e.g., a counter, a timer, etc.);

(k4) the corresponding UL resource for BFR-SR, the corresponding UL resource for BFD RS and/or the corresponding UL resource for NBI RS is reconfigured;

(k5) the BFR procedure (for an SCell) corresponding to the BFR-SR counter is completed;

(k6) the active BWP is switched/deactivated;

(k7) the SCell(s) corresponding to the BFR-SR counter (e.g., the UE triggers the BFR procedure on the SCell(s) and applies the BFR-SR counter for this BFR procedure.) is deactivated;

(k8) if a BFR-SR procedure is triggered and there is no other pending BFR-SR procedure at the UE;

(k9) if a BFR procedure is triggered and there is no other triggered and uncancelled BFR procedure at the UE; and (k10) the BFR-SR counter reaches to the maximum number.

In some implementations, the corresponding BWP may be an active UL and/or DL BWP. The corresponding BWP may be a BWP which is used to transmit the BFR-SR. The corresponding BWP may be a BWP which is used to transmit the BFR report. The corresponding BWP may be a BWP of an SpCell or an SCell.

In some implementations, the corresponding BWP may be switched/deactivated by a PDCCH indicating a DL assignment or an UL grant, by a BWP inactivity timer (e.g., the bwp-InactivityTimer), by RRC signaling, or by the MAC entity itself upon initiation of an RA procedure. Switching a (corresponding) BWP may include activating an inactive BWP and/or deactivating an active BWP.

In some implementations, the corresponding SCell(s) may be an activated SCell(s) which triggers the BFR procedure (for an SCell). The corresponding SCell(s) may be an activated SCell(s) which is used to transmit the BFR-SR. The corresponding SCell(s) may be an SCell which is used to transit the BFR report.

In some implementations, the corresponding SCell(s) may be deactivated by the NW (e.g., based on SCell activation/deactivation MAC CE) or deactivated by the UE (e.g., based on an SCell deactivation timer).

In some implementations, an RA procedure (on an SpCell/SCell) or an BFR procedure (for an SpCell/SCell) may be initiated due to the expiration of a BFR-SR timer and/or a BFR-SR counter reaches a pre-configured value. In some implementations, the BFR-SR timer and/or the BFR-SR prohibit timer may be stopped by the UE if at least one of the following conditions (l1) and (l2) is satisfied.

(l1) Transmission of a BFR report (e.g., BFR MAC CE): in one implementation, an ongoing RA procedure (on an SpCell/SCell) or BFR procedure (on an SpCell/SCell) may be stopped when the UE transmits a MAC PDU on a UL resource provided by a dynamic grant/a configured grant/an RAR. This MAC PDU may include a BFR MAC CE and the sub-header of the BFRQ MAC CE. In one implementation, an ongoing RA procedure (on an SpCell/SCell) or an ongoing BFR procedure (for an SpCell/SCell) may be stopped only if the BFR MAC CE includes all SCells that detect a beam failure event before the MAC PDU assembly.

(l2) An UL resource is available for a new transmission: in one implementation, an ongoing RA procedure (on an SpCell/SCell) or an ongoing BFR procedure (for an SpCell/SCell) may be stopped by the UE's MAC entity if an UL resource is available for transmission of a BFR MAC CE.

In one implementation, the BFR MAC CE confirmation may be cell-based or cell-group-based.

In one implementation, the UL resource may be provided by a dynamic grant, a configured UL grant Type 1/Type 2, and/or an UL grant in an RAR.

In one implementation, the UL resource may be a resource dedicated for the transmission of a BFR MAC CE. The NW may indicate, via the DCI or RRC signaling, to a UE that the corresponding UL resource is for transmission of a BFR MAC CE.

In one implementation, the UL resource is available for a new transmission when the UL resource can accommodate the BFR MAC CE (plus the sub-header of the BFR MAC CE).

In one implementation, the UL resource is available for new transmission when the UL resource is used for BFR MAC CE transmission based on certain restriction(s). In some implementations, the BFR MAC CE may only be transmitted on a specific UL resource. For example, the specific UL resource may implicitly or explicitly indicate specific information. If the UE determines that an allocated UL resource indicates the specific information, the UE may know that the UL resource is allowed to be used for BFR MAC CE transmission.

In one implementation, the UL resource(s) may be considered available if the UL resource is not allocated in a cell where a beam failure event has been detected, a cell where a BSR-SR procedure has been triggered and not cancelled, or a cell where the BFR procedure has been triggered and not cancelled.

In one implementation, the BFR MAC CE may be cell based. That is, the BFR MAC CE may be generated by the UE per serving cell. For example, if a first beam failure event is detected based on a first BFD RS associated with a cell 1, the UE may generate a first BFR MAC CE corresponding to the cell 1; if a second beam failure event is detected based on a second BFD RS associated with a cell 2, the UE may generate a second BFR MAC CE corresponding to the cell 2, and so on. In some implementations, the BFR MAC CE generation corresponding to different cells (e.g., the first BFR MAC CE and the second BFR MAC CE) may be performed by the UE independently. For example, the first BFR MAC CE may be used to transmit the BFR MAC CE which includes the BFR-related information for the cell 1 only, and the second BFR MAC may be used to transmit the BFR MAC CE which includes the BFRQ-related information for the cell 2 only. In some implementations, one BFD RS (set) may be associated with (only) one cell.

In one implementation, the BFR MAC CE may be CG based. For example, if a beam failure event is detected based on a first BFD RS associated with a cell 1 and a second beam failure event is detected based on a second BFR RS associated with a cell 2, a BFR MAC CE (which is CG based) may be generated by the UE once for both of the cell 1 and the cell 2. For example, the UE may transmit a BFR MAC CE that includes the BFR-related information for both of the cell 1 and the cell 2 by generating a single BFR MAC CE. In some implementations, a BFD RS (set) may be associated with a group of cells.

Figure 3:
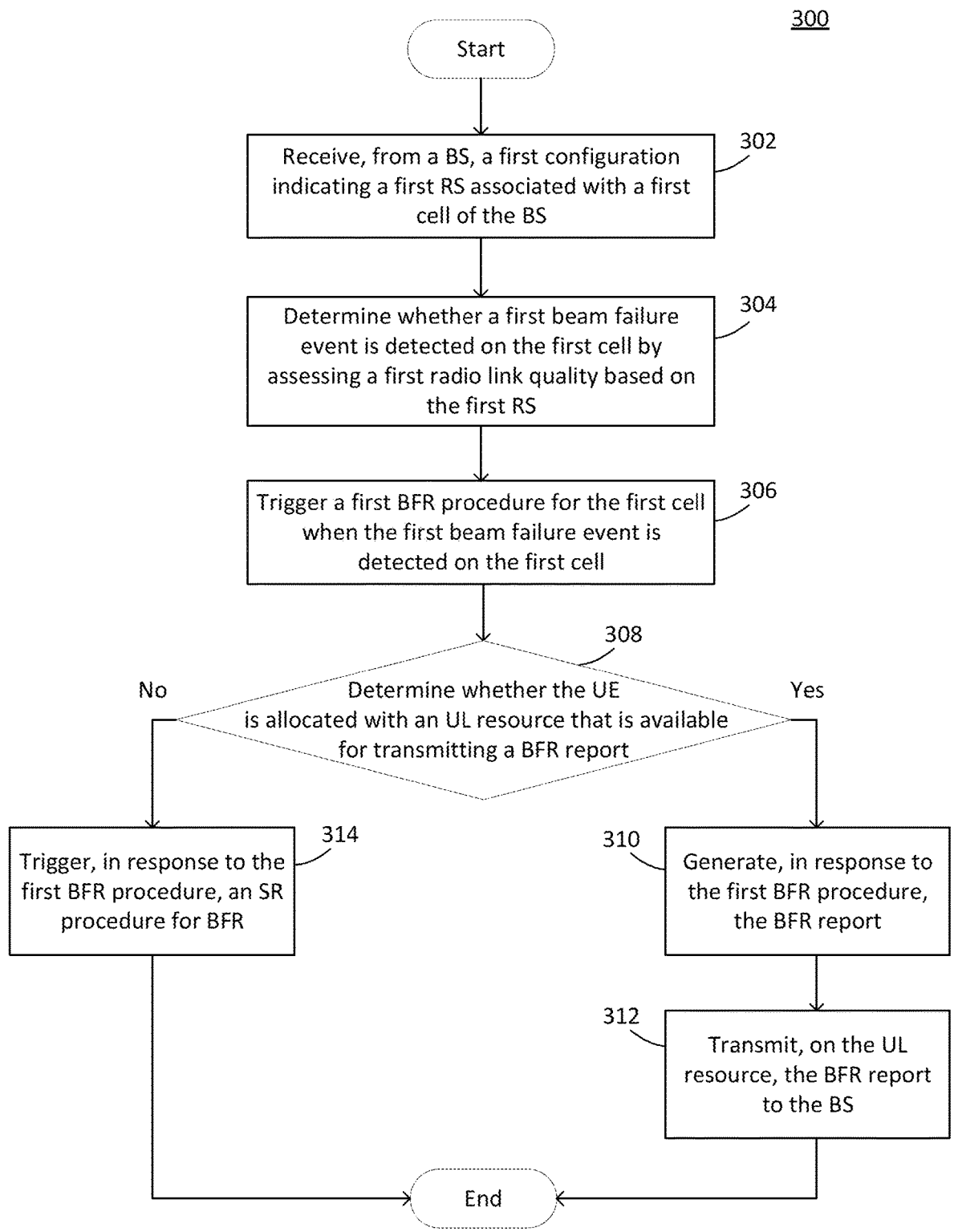
FIG. 3 illustrates a flowchart for a method performed by a UE, in accordance with an implementation of the present disclosure.

FIG. 3 illustrates a flowchart for a method 300 performed by a UE, in accordance with an implementation of the present disclosure. It should be noted that although actions 302, 304, 306, 308, 310, 312 and 314 are delineated as separate actions represented as independent blocks in FIG. 3, these separately delineated actions should not be construed as necessarily order dependent. The order in which the actions are performed in FIG. 3 is not intended to be construed as a limitation, and any number of the described blocks may be combined in any order to implement the method, or an alternate method.

Moreover, one or more of the actions 302, 304, 306, 308, 310, 312 and 314 may be omitted in some of the present implementations.

In action 302, a UE may receive, from a BS, a first configuration indicating a first RS (e.g., BFD RS(s)) associated with a first cell of the BS. For example, during a BFD operation, the BS may configure the UE with BFD RS(s) as the first RS(s). The first configuration may be a measurement configuration for the BFD RS(s), which may include the ID(s) of the BFD RS(s). In some implementations, the first RS may be an SSB or a CSI-RS.

In some implementations, the first cell may be an SCell.

In action 304, the UE may determine whether a first beam failure event is detected on the first cell by assessing a first radio link quality based on the first RS. For example, the PHY layer of the UE may provide a beam failure instance indication to the higher layer (e.g., the MAC entity) of the UE when the first radio link quality to the first cell is worse than a threshold (e.g., the first radio link quality assessed based on the first RS is lower than a threshold). If the UE's MAC entity finds that the number of detected beam failure instances exceeds a configured maximum number (e.g., beamfailureInstanceMaxCount) within a specific period of time (e.g., defined by a BFD timer, beamFailureDetectionTimer), the UE may determine that the first beam failure event is detected.

In action 306, the UE may trigger a first BFR procedure for the first cell when the first beam failure event is detected on the first cell. In some implementations, the first BFR procedure may be a BFR procedure triggered for the first cell. Once the first BFR procedure is triggered, the UE may start performing operations such as an NBI operation, a BFRQ operation, and/or a BFR response operation.

In addition, when the first BFR procedure is triggered and not cancelled, the UE may perform actions 308, 310 and 312 (if the UE is allocated with the available UL resource(s) for a BFR report transmission), and actions 308 and 314 (if the UE is not allocated with the available UL resource(s) for a BFR report transmission).

As shown in FIG. 3, in action 308, the UE may determine whether the UE is allocated with an UL resource that is available for transmitting a BFR report. In some implementations, the UE may determine that an UL resource is available for transmitting a BFR report when the UL resource is available for a new transmission and/or is able to accommodate the BFR report (e.g., a BFR MAC CE) and the sub-header of the BFR report.

In some implementations, the UL resource may be a PUSCH resource.

In actions 310 and 312, when the UE is allocated with the available UL resource, the UE may generate the BFR report in response to the first BFR procedure, and transmit, on the UL resource, the BFR report to the BS.

In some implementations, the BFR report may include at least one of the information about the failed cell (e.g., the cell index/identity of the first cell), the information about the new beam(s) (e.g., a first candidate beam indicator of the first cell), and the no-new-beam information (e.g., a first beam-presence indicator of the first cell). For example, the first beam-presence indicator may be set to either a first value or a second value to indicate whether the UE finds any qualified new beam/candidate beam.

In action 314, when the UE is not allocated with the available UL resource, the UE may trigger, in response to the first BFR procedure, an SR procedure for BFR (or "BFR-SR procedure"). Compared to a legacy SR procedure that is triggered in response to a (regular) BSR procedure for an LCH containing available UL data, the triggering cause of the SR procedure for BFR may be different. Specifically, the SR procedure for BFR may be triggered in response to a BFR procedure, not in response to a BSR procedure. During the SR procedure for BFR, the UE may transmit an SR for BFR (or an "BFR-SR") to the BS to request for an UL resource for BFR report transmission.

In some implementations, the UE may trigger a BFR procedure for each beam failure event detected on each cell (e.g., an SpCell or an SCell). In this condition, there may be multiple triggered BFR procedures at the UE (ongoing) at the same time, as shown in FIG. 4.

Figure 4:
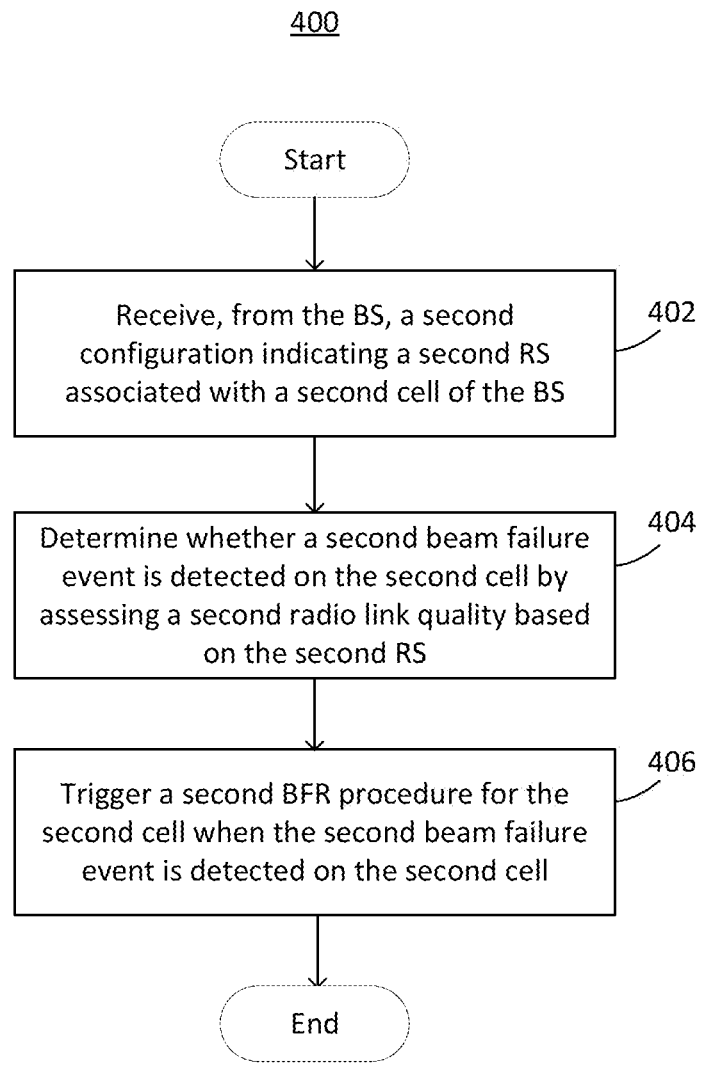
FIG. 4 illustrates a flowchart for a method performed by a UE according to an implementation of the present disclosure.

FIG. 4 illustrates a flowchart for a method 400 performed by a UE according to an implementation of the present disclosure. As shown in FIG. 4, in action 402, the UE may receive, from the BS, a second configuration indicating a second RS associated with a second cell of the BS. For example, during a BFD operation, the BS may configure the UE with BFD RS(s) as the second RS(s). The second configuration may be a measurement configuration for the BFD RS(s), which may include the ID(s) of the BFD RS(s). In some implementations, the second RS may be an SSB or a CSI-RS.

In some implementations, the second cell may be an SpCell or an SCell.

In action 404, the UE may determine whether a second beam failure event is detected on the second cell by assessing a second radio link quality based on the second RS. For example, the PHY layer of the UE may provide a beam failure instance indication to the higher layer (e.g., the MAC entity) of the UE when the second radio link quality to the second cell is worse than a threshold (e.g., the second radio link quality assessed based on the first RS is lower than a threshold). If the UE's MAC entity finds that the number of detected beam failure instances exceeds a configured maximum number (e.g., beamfailureInstanceMaxCount) within a specific period of time (e.g., defined by a BFD timer, beamFailureDetectionTimer), the UE may determine that the second beam failure event is detected.

In action 406, the UE may trigger a second BFR procedure for the second cell when the second beam failure event is detected on the second cell.

In some implementations, the UE may transmit the (BFR-related) information for each failed cell (e.g., a cell on which a beam failure event is detected) through a single BFR report (e.g., a single MAC CE). For example, the BFR report generated in action 310 in FIG. 3 may further include the (BFR-related) information for the second cell (e.g., at least one of a second cell index/identity of the second cell, a second beam-presence indicator of the second cell, and a second candidate beam indicator of the second cell).

In some implementations, after triggering an SR procedure for BFR, the UE may trigger/initiate an RA procedure if the UE is not configured with a PUCCH resource and/or if there is no valid PUCCH resource for transmitting an SR for BFR.

Figure 5:
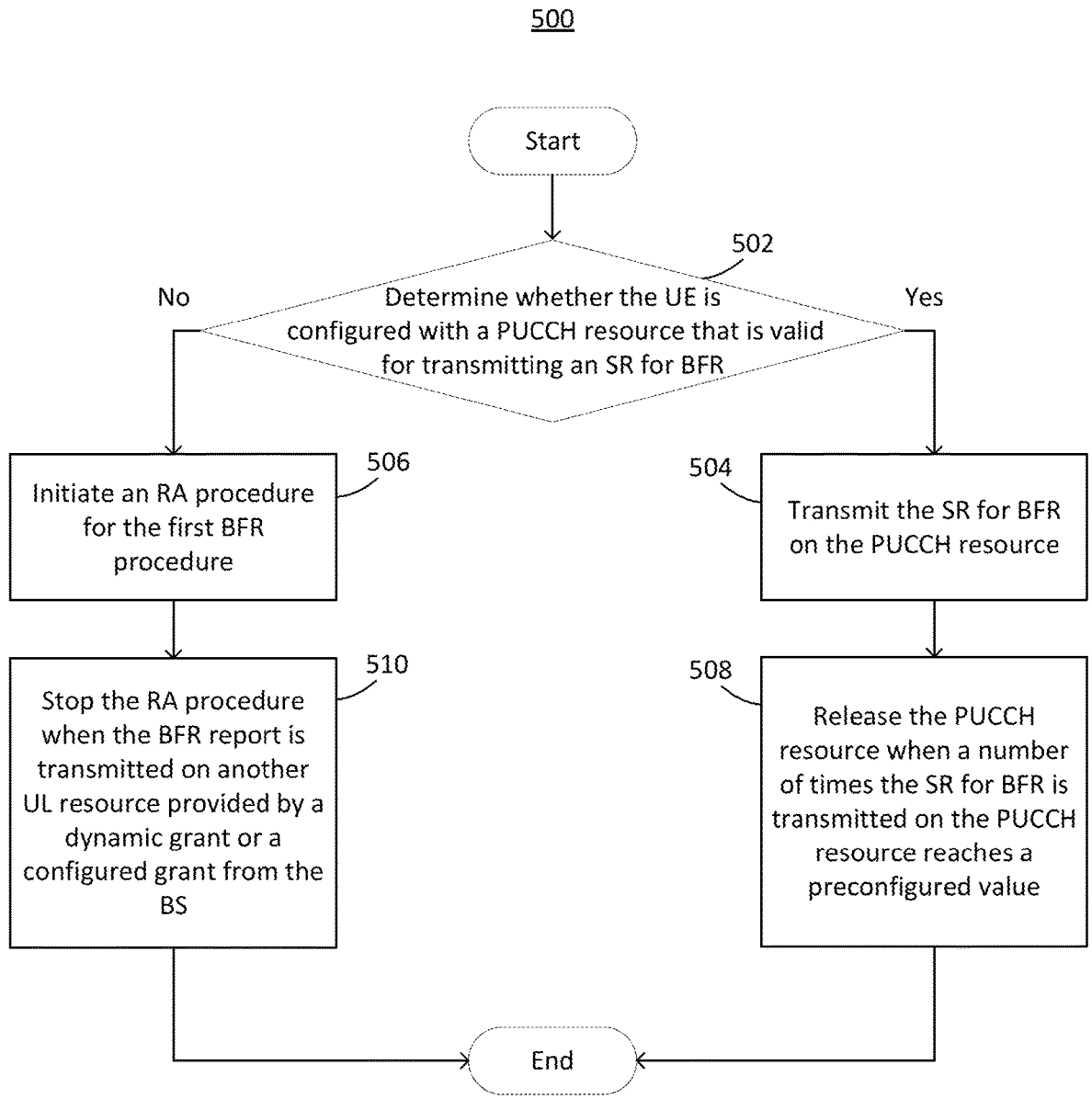
FIG. 5 illustrates a flowchart for a method performed by a UE according to an implementation of the present disclosure.

FIG. 5 illustrates a flowchart for a method 500 performed by a UE according to an implementation of the present disclosure. As shown in FIG. 5, when an SR procedure for BFR is triggered and not cancelled, actions 502, 504 and 506 may be performed.

In action 502, the UE may determine whether the UE is configured with a PUCCH resource that is valid for transmitting an SR for BFR.

In action 504, the UE may transmit the SR for BFR on the PUCCH resource when the UE is configured with the PUCCH resource that is valid for transmitting an SR for BFR.

In action 506, the UE may initiate an RA procedure for the first BFR procedure when the UE is not configured with the PUCCH resource and/or there is no valid PUCCH resource for transmitting an SR for BFR.

In some implementations, the method 500 may further include actions 508 and 510.

In action 508, if the UE is configured with a PUCCH resource for BFR-SR transmission, the UE may release the PUCCH resource when the number of times the SR for BFR has been transmitted on the PUCCH resource reaches a preconfigured value (e.g., configured by the BS or prestored in the UE without any signaling from the BS).

In action 510, after initiating the RA procedure, the UE may stop the RA procedure when the BFR report has been transmitted on another UL resource that is provided by a dynamic grant or a configured grant from the BS (e.g., the UL resource is not provided by the RAR during the RA procedure).

The following provides the non-limiting descriptions of certain terms.

In some implementations, a CC, cell, and/or serving cell may be PCell, PSCell, and/or SCell.

In some implementations, an SpCell may include PCell and PSCell.

In some implementations, an UL resource may be RACH resource, PUCCH resource, and/or PUSCH resource. The UL resource may be scheduled by dynamic grant (e.g., via PDCCH), RAR, and/or configured by RRC (e.g., type 1/type 2 configured UL grant or pre-configured in RRC configuration).

In some implementations, when a beam failure event (of an SCell(s)) is detected, the UE may trigger a BFR procedure (for an SCell(s)).

In some implementations, when a beam failure event (of an SpCell) is detected, the UE may trigger a BFR procedure (for an SpCell).

In some implementations, a BFR procedure may be used to recover from the beam failure event detected on the SpCell(s) and/or the SCell(s).

In some implementations, a RACH-based BFR procedure may be performed based on contention free RA procedure and/or contention-based RA procedure. The RACH-based BFR procedure may be initiated when the corresponding RA procedure is initiated. The RACH-based BFR procedure may be considered ongoing when the corresponding RA procedure is ongoing. The RACH-based BFR procedure is stopped when the corresponding RA procedure is stopped. The RACH-based BFR procedure is completed when the corresponding RA procedure is completed.

In some implementations, a MAC entity/PHY layer/RRC layer may refer to the UE.

In some implementations, the BFR-SR transmission (e.g., action 1A illustrated in FIG. 1) of a BFR procedure triggered for an SCell may be replaced by a Physical Random Access Channel (PRACH) transmission. For example, in the BFR-SR transmission of the BFRQ operation, the UE may perform a PRACH transmission (e.g., transmits preamble) to request for an UL resource for BFR report transmission.

In some implementations, the BFR report (MAC CE) transmission of the BFRQ operation (e.g., action 2A illustrated in FIG. 1) of a BFR procedure triggered for an SCell may be replaced by transmitting Uplink Control Information (UCI). For example, the UCI may include BFR-related information such as (1) the (failed) CC/cell information (e.g., cell index), (2) the (failed) set/group(s) of cells (e.g., the set/group may be pre-configured by NW), (3) the (failed) Transmission/Reception Point (TRP) information, (4) the corresponding measurement result (e.g., RSRP, Signal to Interference plus Noise Ratio (SINR), etc.) of the (failed)

CC, set/group of cells, or TRP, (5) the candidate beam information/indicator (or "new beam information") (e.g., indicating one or more qualified beams selected based on the measurement for the NBI RS(s)), (6) the no-new-beam information (e.g., indicating that the UE cannot find any new beam with the RSRP higher than a threshold for the (failed) CC, set/group of cells, TRP, etc.

In some implementations, the NW may refer to an NW node, a BS, a gNB, an eNB, a TRP, or a cell.

In some implementations, a TRP may provide network coverage and directly communicates with UEs. A TRP may also be referred to as distributed unit (DU).

In some implementations, a cell may be composed by one or multiple associated TRPs. For example, the coverage of a cell may be composed by coverage of all associated TRP(s). A cell may be controlled by a BS. A cell may refer to a TRP Group (TRPG).

In some implementations, a serving beam for a UE may be a beam generated by the NW, which may be used to communicate with the UE (e.g. for transmission and/or reception).

In some implementations, in order to cover all possible directions for transmission and/or reception, a number of beams may be required. Beam sweeping may be an operation that generates a subset of the beams in a time interval and changes the generated beam(s) in other time interval(s) (e.g., changing the beam in the time domain). In this way, all possible directions may be covered after several time intervals.

In some implementations, the NW may have multiple TRPs (e.g., centralized or distributed). Each TRP may form multiple beams for transmission and/or reception. The number of beams and the number of simultaneous beams in the time/frequency domain may depend on the number of antenna array elements and the Radio Frequency (RF) at the TRP. The TRP may apply beamforming to both data and control signaling transmission or reception. The number of beams generated concurrently by a TRP may depend on the TRP's capability (e.g. the maximum number of beams generated concurrently by different TRPs in the same cell may be the same, while the maximum number of beams generated concurrently by different TRPs in different cells may be different). In some implementations, beam sweeping may be required for providing the control signaling in different directions.

In some implementations, a beam may be a DL or UL beam. The beam may be transmission (Tx) beam and/or reception (Rx) beam. The beam may be UE beam and/or NW beam. The beam may refer to (or associated with) an RS (e.g., an SSB, a CSI-RS, or an SRS), and/or a Transmission Configuration Indication (TCI) state.

In some implementations, a (new/candidate) beam may be indicated to the UE via an RS (e.g., SSB, CSI-RS, and/or SRS), and/or a TCI state.

In some implementations, the term "beam" may be replaced by the term "spatial filter." For example, when a UE reports a preferred gNB Tx beam, the UE may select a spatial filter used by gNB. The term "beam information" may be used to provide information about which beam/spatial filter is being used/selected. In one implementation, individual RSs may be transmitted by applying individual beams (spatial filters). Thus, the beam or the beam information may be represented by RS resource index(es).

In some implementations, a MAC entity (or a UE) may be configured with zero, one, or more BFR-SR configurations. A BFR-SR configuration may consist of one or a set of PUCCH resource for SR transmissions across different BWPs and cells.

In some implementation, the BFR report may include a MAC CE and a sub-header of the MAC CE.

In some implementations, an SR (e.g., used in a legacy SR procedure) may be used for requesting Uplink Shared Channel (UL-SCH) resource (e.g., a PUSCH resource) for a new transmission. The UE may be configured with zero, one, or more SR configurations. An SR configuration may consist of a set of PUCCH resources for SR across different BWPs and cells. For an LCH, at most one PUCCH resource for SR may be configured per BWP. Each SR configuration may correspond to one or more LCHs. Each LCH may be mapped to zero or one SR configuration. The SR configuration of the LCH that triggered the BSR (if such a configuration exists) is considered as corresponding SR configuration for the triggered SR. When an SR is triggered, it shall be considered as pending until it is cancelled.

In some implementations, a BFR-SR may be transmitted in the BFR-SR transmission (e.g., action 1A illustrated in FIG. 1) of the BFRQ operation. The BFR-SR may be transmitted on a dedicated SR-like PUCCH resource for BFR. The BFR-SR may be used to inform the NW of a beam failure event and/or used for requesting for an UL-SCH resource for BFR report transmission. The UL resource required by a BFR-SR may (only) be used for BFR (report transmission). The UE may be configured with zero, one, or more BFR-SR configuration. The PUCCH resource for BFR-SR may be configured per BWP, per TRP, per CC, per set of CCs, per CG, and/or per UE. The PUCCH resource for BFR-SR may be configured on a PCell, a PSCell, and/or a (PUCCH) SCell. The BFR-SR may be transmitted on a PCell, a PSCell, and/or an SCell accordingly. In some implementations, the BFR-SR may be transmitted through a cross-cell transmission (e.g., the beam failure event happens on an SCell, and the BFR-SR corresponding to the beam failure event is transmitted on a PCell). In some implementations, the BFR-SR configuration may be a specific configuration which is not one of the SR configurations (e.g., the ID of BFR-SR configuration is not shared with the parameter, schedulingRequestid.) In some implementations, the BFR-SR configuration may be one of the SR configurations (e.g., the ID of BFR-SR configuration is shared with the schedulingRequestid.) In some implementations, the BFR-SR may have the highest priority among all SR configurations configured to the UE. In some implementations, the BFR-SR configuration may be configured per BWP, per TRP, per CC, per set of CCs, per CG, and/or per UE.

In some implementations, a BFR report may be transmitted via the BFR report (MAC CE) transmission of the BFRQ operation (e.g., action 2A illustrated in FIG. 1). The BFR report may be transmitted on any available UL grant which could accommodate the BFR report. In some implementations, the BFR report may (only) be transmitted on a specific UL grant which is requested by BFR-SR. In some implementations, whether the specific UL grant is requested by BFR-SR may be indicated based on some implicit or explicit method. In some implementations, the term "BFR MAC CE" may be used to describe a BFR report transmitted by a MAC CE. In some implementations, the BFR report may be transmitted by the MAC CE(s). In some implementations, a BFR report may be transmitted on a PUSCH. In some implementations, a BFR report may include at least one of the following items (m1)-(m6):

(m1) the (failed) CC (or cell) information (e.g., cell index/ID);

(m2) the (failed) set/group(s) of cells (e.g., the set/group may be pre-configured by the NW);

(m3) the (failed) TRP information;

(m4) the corresponding measurement result (e.g., RSRP, SINR, etc.) of the (failed) CC (or the set/group of cells, TRP, etc.);

(m5) the candidate beam information/indicator (or "new beam information") (e.g., one or more qualified beam may be selected based on the measurement for the NBI RS(s)); and (m6) the no-new-beam information (e.g., beam presence indicator, which may be provided if the UE cannot find any new beam with its RSRP higher than a threshold for the (failed) CC (or the set/group of cells, TRP, etc.)).

In some implementations, a BFD RS may be a set of RSs (e.g., SSB and/or CSI-RS) which may be used for beam failure detection. Different sets of the BFD RSs may be associated with different CCs (or cells), different sets/groups of cells, or different TRPs. For example, if a first set of the BFD RSs is associated a first CC, and the UE detects that the quality of the first set of the BFD RSs is lower than a threshold for a period of time, the UE may determine that the first CC is failed (or a beam failure event is detected). On the other hand, if no BFD RSs are provided for a CC (or cell) for beam failure detection, the UE may perform beam monitoring based on the activated TCI-state for a PDCCH of the CC (or cell). The BFD RS may be transmitted in (the active BWP of) the current CC or another CC (e.g., within the same frequency band). In some implementations the BFD RS and the BFR-SR may be configured in the same configuration.

In some implementations, an NBI RS may be a set of RSs (e.g., SSB and/or CSI-RS) which may be used for new beam identification. Different sets of the NBI RSs may be configured for different CCs (or cells), sets/groups of cells, or TRPs. For example, if a first set of the NBI RS is configured for a first CC (or cell), and the UE detects a beam failure event on the first CC (or cell), the UE may select a new beam/candidate beam based on the measurement results for the first set of the NBI RSs. For example, the UE may select a beam having the highest RSRP (or having an RSRP larger than a threshold) within the first set of the NBI RS as the new beam for BFR. The UE may include the information of the NBI RS in a BFR report. The NBI RS (e.g., an SSB and/or a CSI-RS) may be transmitted in (the active BWP of) the CC which is configured with the beam failure recovery mechanism or another CC within the same frequency band.

Figure 6:
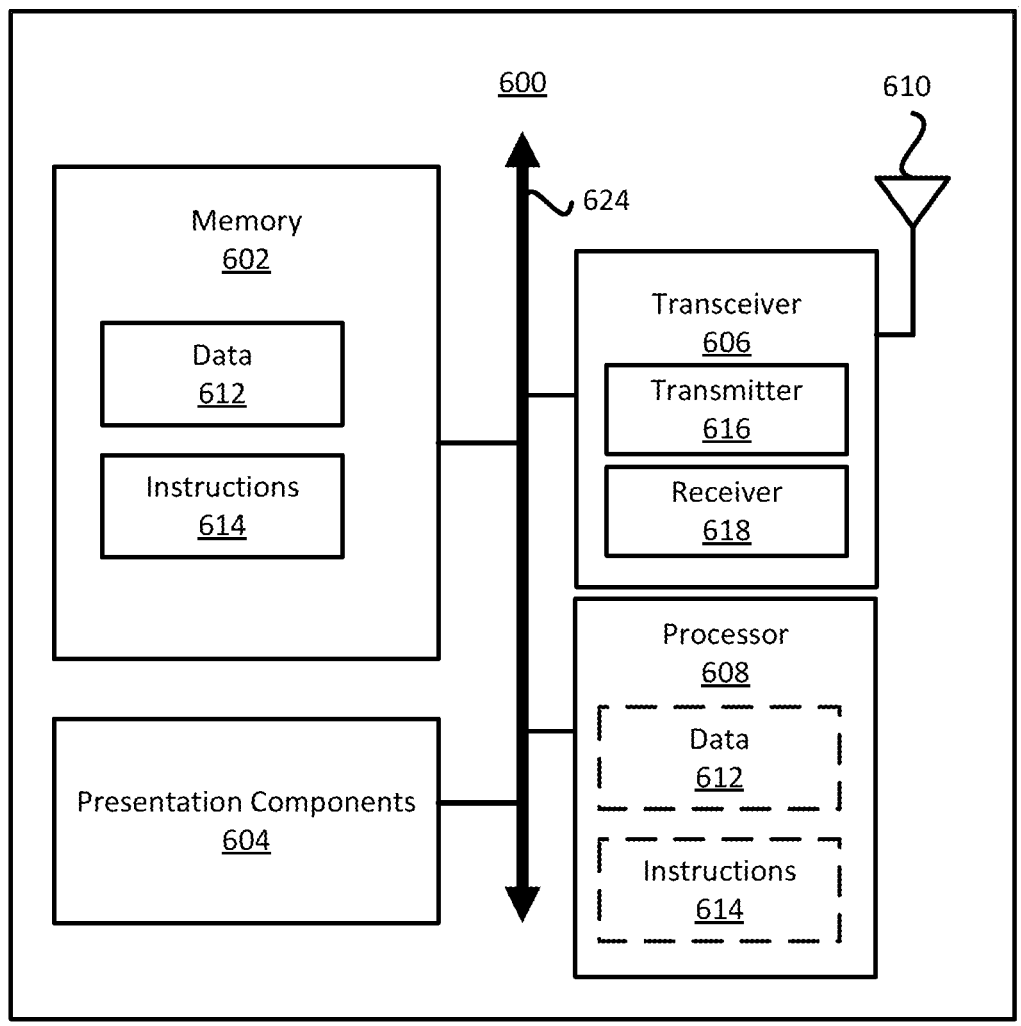
FIG. 6 illustrates a block diagram of a node for wireless communication, in accordance with various aspects of the present disclosure.

FIG. 6 illustrates a block diagram of a node for wireless communication, in accordance with various aspects of the present disclosure. As shown in FIG. 6, a node 600 may include a transceiver 606, a processor 608, a memory 602, one or more presentation components 604, and at least one antenna 610. The node 600 may also include an RF spectrum band module, a BS communications module, a network communications module, and a system communications management module, Input/Output (I/O) ports, I/O components, and power supply (not explicitly illustrated in FIG. 6). Each of these components may be in communication with each other, directly or indirectly, over one or more buses 624. In one implementation, the node 600 may be a UE or a BS that performs various functions described herein, for example, with reference to FIGS. 1 through 5.

The transceiver 606 having a transmitter 616 (e.g., transmitting/transmission circuitry) and a receiver 618 (e.g., receiving/reception circuitry) may be configured to transmit and/or receive time and/or frequency resource partitioning information. In some implementations, the transceiver 606 may be configured to transmit in different types of subframes and slots including, but not limited to, usable, non-usable and flexibly usable subframes and slot formats. The transceiver 606 may be configured to receive data and control channels.

The node 600 may include a variety of computer-readable media. Computer-readable media can be any available media that can be accessed by the node 600 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules or other data in a modulated data signal such as a carrier wave or other transport mechanism and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

The memory 602 may include computer-storage media in the form of volatile and/or non-volatile memory. The memory 602 may be removable, non-removable, or a combination thereof. For example, the memory 602 may include solid-state memory, hard drives, optical-disc drives, etc. As illustrated in FIG. 6, the memory 602 may store computer-readable and/or -executable instructions 614 (e.g., software codes) that are configured to, when executed, cause the processor 608 to perform various functions described herein, for example, with reference to FIGS. 1 through 5. Alternatively, the instructions 614 may not be directly executable by the processor 608 but may be configured to cause the node 600 (e.g., when compiled and executed) to perform various functions described herein.

The processor 608 (e.g., having processing circuitry) may include an intelligent hardware device, a Central Processing Unit (CPU), a microcontroller, an ASIC, etc. The processor 608 may include memory. The processor 608 may process the data 612 and the instructions 614 received from the memory 602, and information through the transceiver 606, the base band communications module, and/or the network communications module. The processor 608 may also process information to be sent to the transceiver 606 for transmission through the antenna 610, to the network communications module for transmission to a core network.

One or more presentation components 604 may present data indications to a person or other device. Examples of presentation components 604 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a Beam Failure Recovery (BFR) procedure performed by a User Equipment (UE), the method comprising:
   receiving, from a Base Station (BS), a first configuration indicating a first Reference Signal (RS) associated with a first cell of the BS;
   determining whether a first beam failure event is detected on the first cell by assessing a first radio link quality based on the first RS;
   triggering a first BFR procedure for the first cell when the first beam failure event is detected on the first cell; and
   when the first BFR procedure is triggered and not cancelled, determining whether the UE is allocated with an Uplink (UL) resource that is available for transmitting a BFR report, the UL resource being a Physical Uplink Shared Channel (PUSCH) resource;
   when the UE is allocated with the UL resource, generating, in response to the first BFR procedure, the BFR report, and
   transmitting, on the UL resource, the BFR report to the BS; and
   when the UE is not allocated with the UL resource, triggering, in response to the first BFR procedure, a Scheduling Request (SR) procedure for BFR.

2. The method of claim 1, wherein the BFR report includes at least one of a first cell identity of the first cell, a first beam-presence indicator of the first cell, and a first candidate beam indicator of the first cell.

3. The method of claim 1, further comprising:
   receiving, from the BS, a second configuration indicating a second RS associated with a second cell of the BS;
   determining whether a second beam failure event is detected on the second cell by assessing a second radio link quality based on the second RS; and
   triggering a second BFR procedure for the second cell when the second beam failure event is detected on the second cell.

4. The method of claim 3, wherein the second cell is a Special Cell (SpCell) or a Secondary Cell (SCell).

5. The method of claim 1, wherein the first cell is a Secondary Cell (SCell).

6. The method of claim 1, further comprising:
   determining that the UL resource is available for transmitting the BFR report when the UL resource is able to accommodate the BFR report and a sub-header of the BFR report.

7. The method of claim 1, further comprising:
   when the SR procedure for BFR is triggered and not cancelled, determining whether the UE is configured with a Physical Uplink Control Channel (PUCCH) resource that is valid for transmitting an SR for BFR;
   transmitting the SR for BFR on the PUCCH resource when the UE is configured with the PUCCH resource; and
   initiating a Random Access (RA) procedure for the first BFR procedure when the UE is not configured with the PUCCH resource.

8. The method of claim 7, further comprising:
   stopping the RA procedure when the BFR report is transmitted on another UL resource provided by a dynamic grant or a configured grant from the BS.

9. The method of claim 7, further comprising:
   releasing the PUCCH resource when a number of times the SR for BFR is transmitted on the PUCCH resource reaches a preconfigured value.

10. A User Equipment (UE) for performing a Beam Failure Recovery (BFR) procedure, the UE comprising:
    at least one memory storing a set of instructions; and
    at least one processor coupled to the at least one memory, the at least one processor configured to execute the set of instructions to:
    receive, from a Base Station (BS), a first configuration indicating a first Reference Signal (RS) associated with a first cell of the BS;
    determine whether a first beam failure event is detected on the first cell by assessing a first radio link quality based on the first RS;
    trigger a first BFR procedure for the first cell when the first beam failure event is detected on the first cell; and
    when the first BFR procedure is triggered and not cancelled, determine whether the UE is allocated with an Uplink (UL) resource that is available for transmitting a BFR report, the UL resource being a Physical Uplink Shared Channel (PUSCH) resource;
    when the UE is allocated with the UL resource, generate, in response to the first BFR procedure, the BFR report, and
    transmit, on the UL resource, the BFR report to the BS; and
    when the UE is not allocated with the UL resource, trigger, in response to the first BFR procedure, a Scheduling Request (SR) procedure for BFR.

11. The UE of claim 10, wherein the BFR report includes at least one of a first cell identity of the first cell, a first beam-presence indicator of the first cell, and a first candidate beam indicator of the first cell.

12. The UE of claim 11, wherein the at least one processor is further configured to execute the set of instructions to:
    receive, from the BS, a second configuration indicating a second RS associated with a second cell of the BS;
    determine whether a second beam failure event is detected on the second cell by assessing a second radio link quality based on the second RS; and
    trigger a second BFR procedure for the second cell when the second beam failure event is detected on the second cell.

13. The UE of claim 12, wherein the second cell is a Special Cell (SpCell) or a Secondary Cell (SCell).

14. The UE of claim 10, wherein the first cell is a Secondary Cell (SCell).

15. The UE of claim 10, wherein the at least one processor is further configured to execute the set of instructions to:
    determine that the UL resource is available for transmitting the BFR report when the UL resource is able to accommodate the BFR report and a sub-header of the BFR report.

16. The UE of claim 10, wherein the at least one processor is further configured to execute the set of instructions to:
    when the SR procedure for BFR is triggered and not cancelled, determine whether the UE is configured with a Physical Uplink Control Channel (PUCCH) resource that is valid for transmitting an SR for BFR;

transmit the SR for BFR on the PUCCH resource when the UE is configured with the PUCCH resource; and initiate a Random Access (RA) procedure for the first BFR procedure when the UE is not configured with the PUCCH resource.

17. The UE of claim 16, wherein the at least one processor is further configured to execute the set of instructions to:

stop the RA procedure when the BFR report is transmitted on another UL resource provided by a dynamic grant or a configured grant from the BS.

18. The UE of claim 16, wherein the at least one processor is further configured to execute the set of instructions to:

release the PUCCH resource when a number of times the SR for BFR is transmitted on the PUCCH resource reaches a preconfigured value.

* * * * *